US012238171B2

United States Patent
Mizuno et al.

(10) Patent No.: US 12,238,171 B2
(45) Date of Patent: Feb. 25, 2025

(54) INFORMATION COMMUNICATION APPARATUS, INFORMATION COMMUNICATION METHOD AND PROGRAM

(71) Applicant: NIPPON TELEGRAPH AND TELEPHONE CORPORATION, Tokyo (JP)

(72) Inventors: Shintaro Mizuno, Tokyo (JP); Kenji Shimizu, Tokyo (JP); Masahisa Kawashima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/553,360

(22) PCT Filed: Apr. 19, 2021

(86) PCT No.: PCT/JP2021/015929
§ 371 (c)(1),
(2) Date: Sep. 29, 2023

(87) PCT Pub. No.: WO2022/224321
PCT Pub. Date: Oct. 27, 2022

(65) Prior Publication Data
US 2024/0195873 A1    Jun. 13, 2024

(51) Int. Cl.
*H04L 67/1097*    (2022.01)
*H04L 45/00*    (2022.01)

(52) U.S. Cl.
CPC .......... *H04L 67/1097* (2013.01); *H04L 45/66* (2013.01)

(58) Field of Classification Search
CPC .............................. H04L 67/1097; H04L 45/66
See application file for complete search history.

(56) References Cited

U.S. PATENT DOCUMENTS 8,953,500 B1 * 2/2015 Shen ....................... H04L 45/16
370/256
9,819,937 B1 * 11/2017 Helter ................. H04N 19/428
(Continued)

FOREIGN PATENT DOCUMENTS

| JP | H09-218749 | 8/1997 |
| WO | 2015/071960 | 5/2015 |
| WO | 2017/044399 | 3/2017 |

OTHER PUBLICATIONS

Hiroshi Watanabe, "Real-time analysis of surveillance camera images and high-precision prediction of congestion" NTT East GIGA RAKU camera, Published on Aug. 18, 2016, Internet [retrieved on Sep. 28, 2023] (the Internet) <URL: https://monoist.atmarkit.co.jp/mn/articles/1608/18/news119.html>.

*Primary Examiner* — Kostas J Katsikis
(74) *Attorney, Agent, or Firm* — IPUSA, PLLC

(57) ABSTRACT

An information communication apparatus, which aggregates data transmitted from a plurality of terminals and transmits the aggregated data to a reception side. The information communication apparatus includes: a determination means that operates in a first layer for determining an update size of a memory area used to hold the data transmitted from the plurality of terminals on a basis of information related to the data; and a setting means that sets a band of a network path of a second layer necessary for communicating with the reception side on a basis of the update size and an update rate of the data.

7 Claims, 22 Drawing Sheets

(56) References Cited

U.S. PATENT DOCUMENTS

| | | | | |
|---|---|---|---|---|
| 2008/0183525 | A1* | 7/2008 | Tsuji | G06Q 10/10 |
| | | | | 705/7.18 |
| 2012/0254549 | A1* | 10/2012 | Hutchison | G06F 12/0246 |
| | | | | 711/E12.04 |
| 2015/0281126 | A1* | 10/2015 | Regula | H04L 67/55 |
| | | | | 709/212 |
| 2016/0350260 | A1* | 12/2016 | Tsirkin | G06F 9/45558 |
| 2017/0279741 | A1* | 9/2017 | Elias | H04L 43/16 |
| 2019/0243552 | A1* | 8/2019 | Maharana | G06F 12/00 |
| 2019/0262722 | A1* | 8/2019 | Keefe | A63F 13/843 |
| 2019/0327506 | A1* | 10/2019 | Zou | H04N 21/2223 |
| 2020/0344299 | A1* | 10/2020 | Sohail | G06F 3/067 |

\* cited by examiner

[Fig. 1]
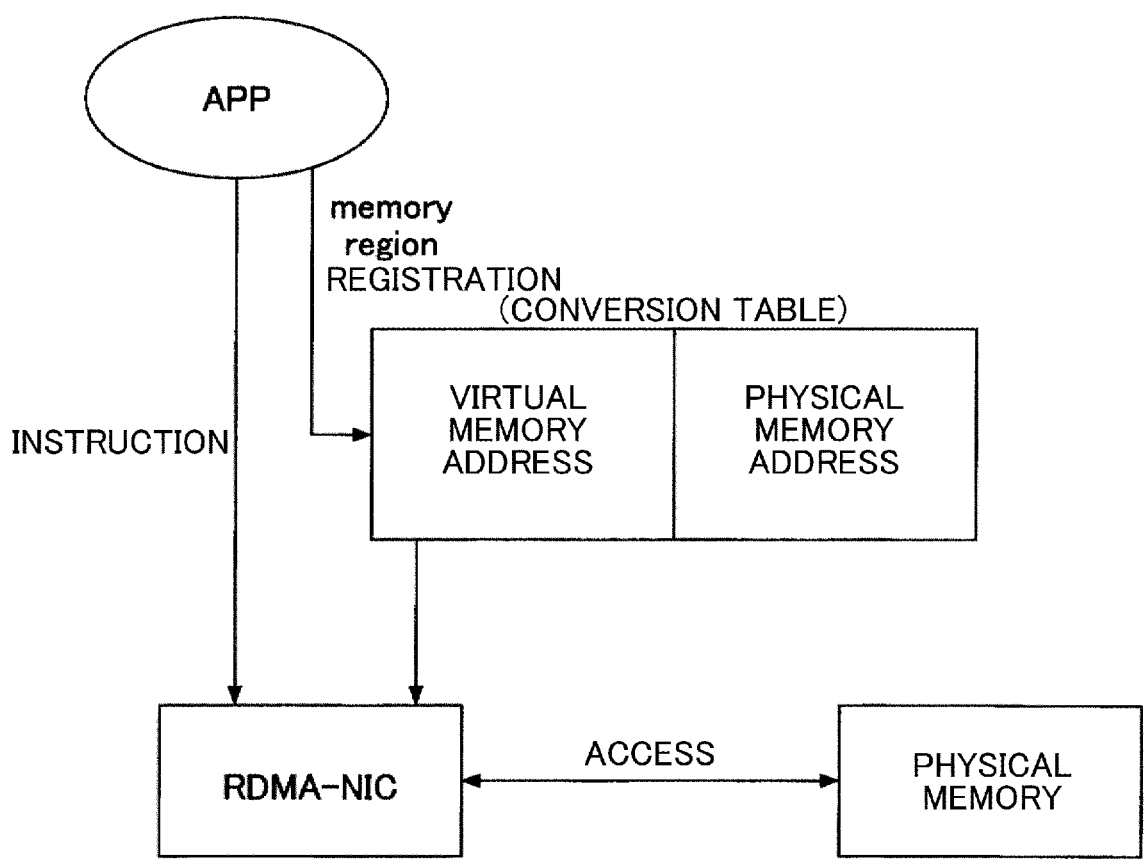

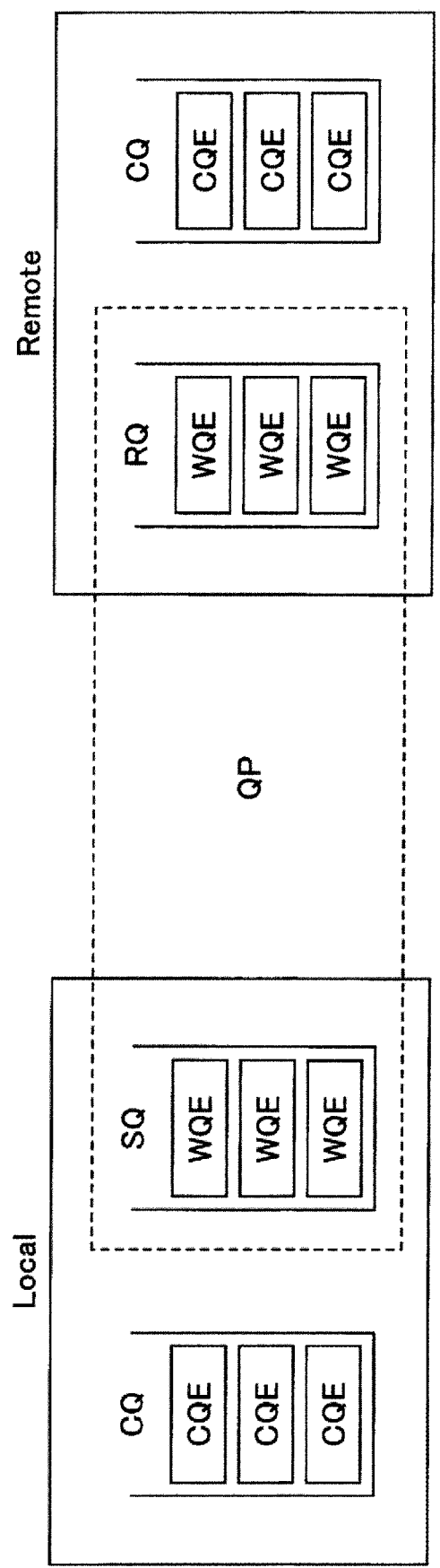
[Fig. 2]

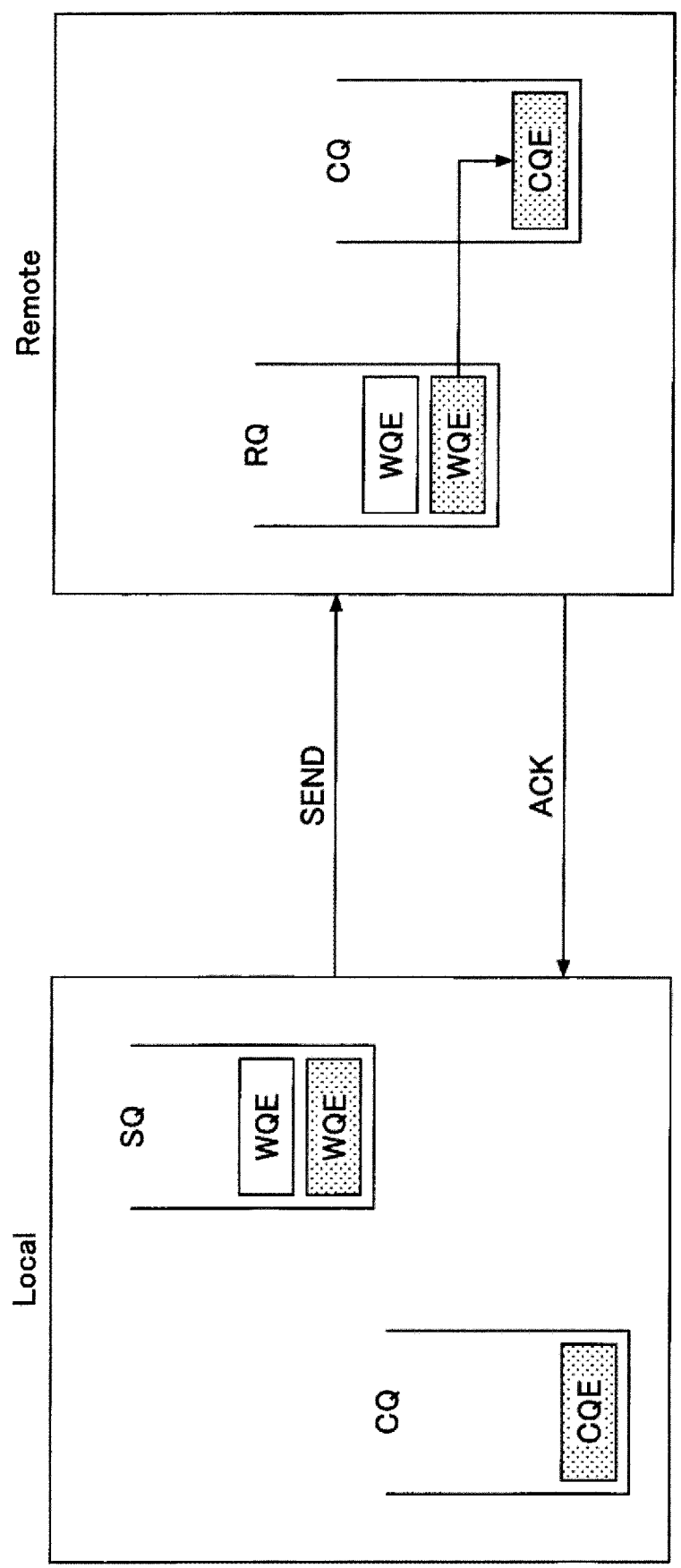
[Fig. 3]

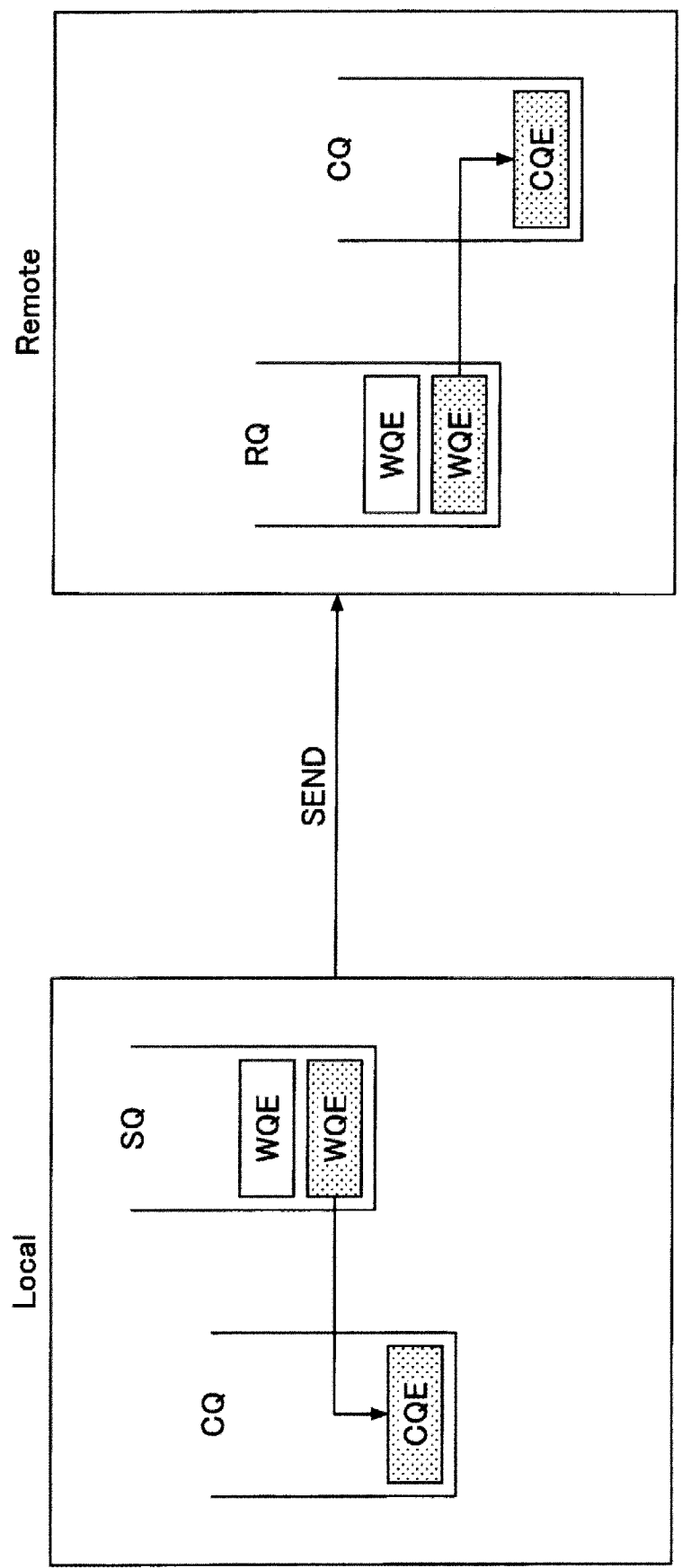
[Fig. 4]

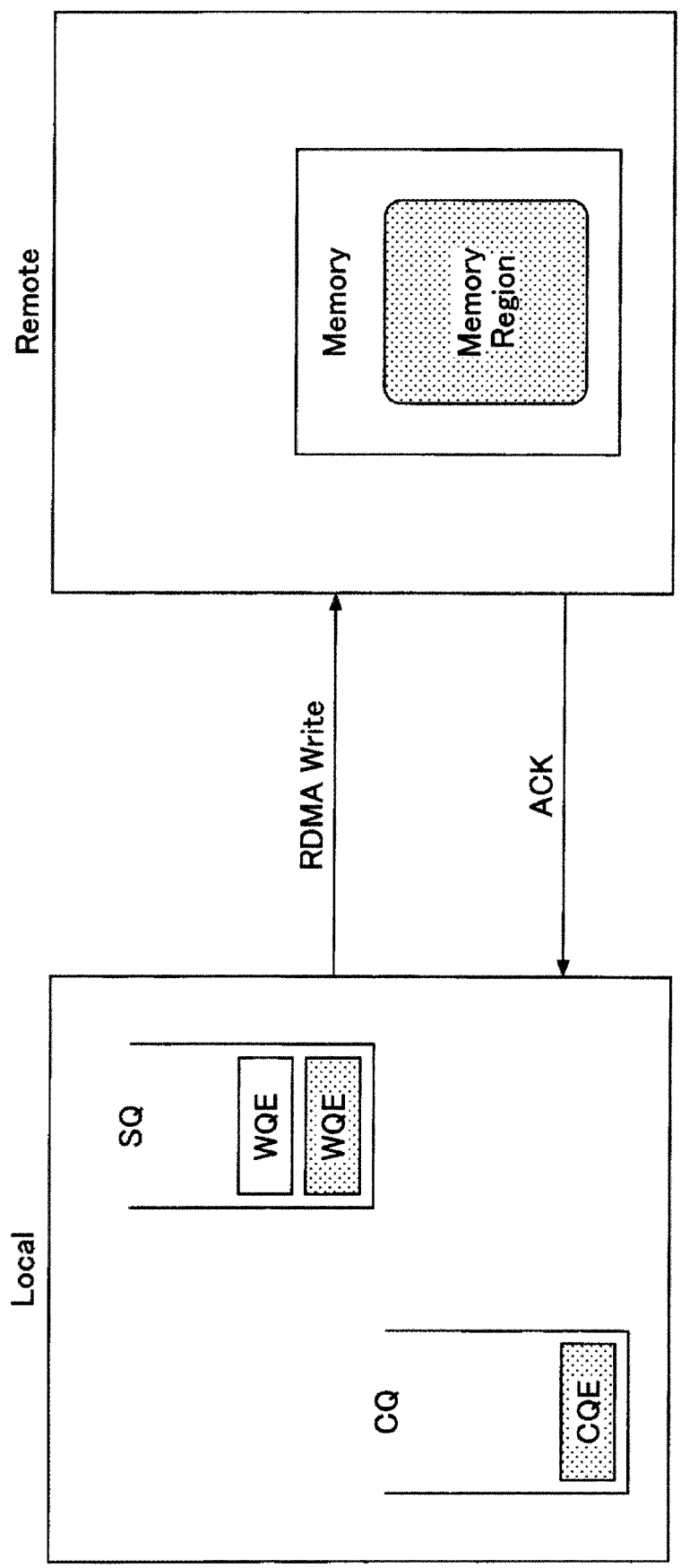
[Fig. 5]

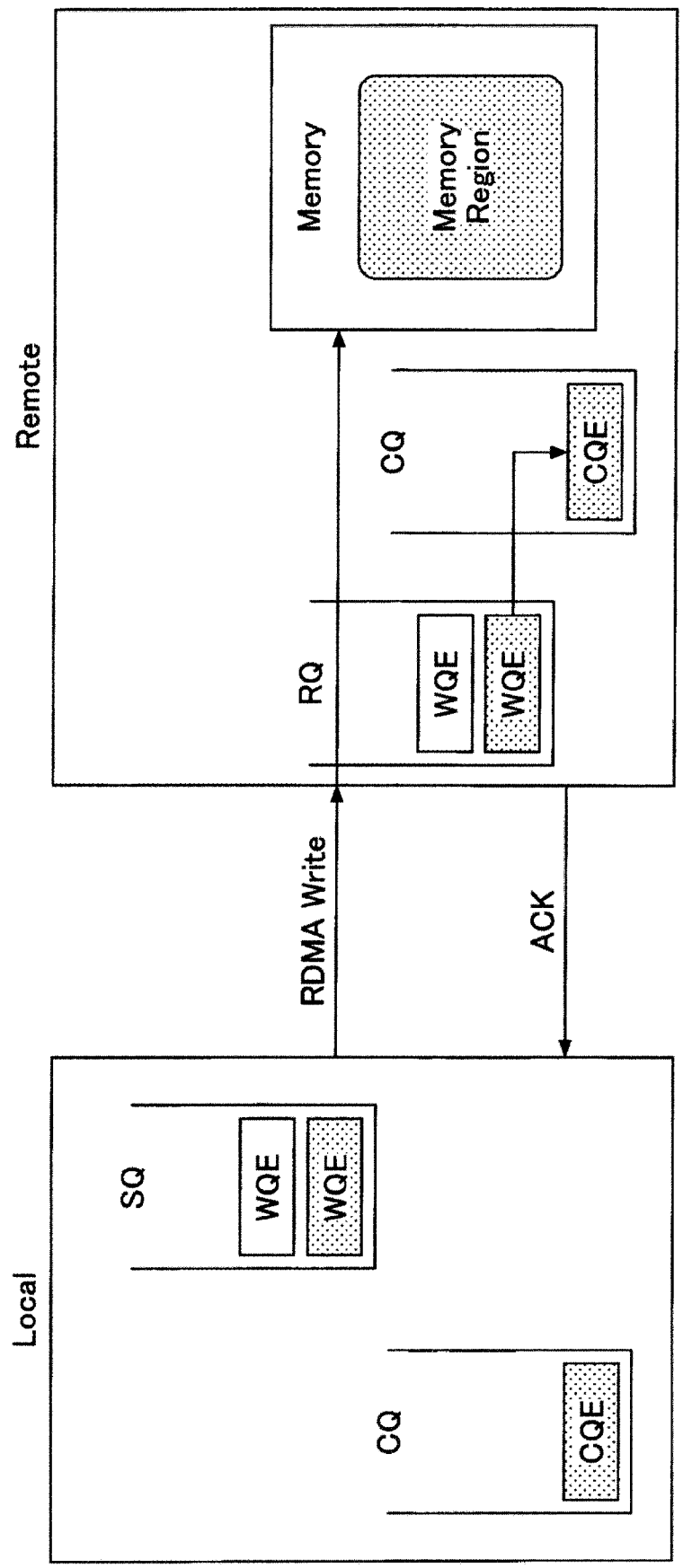
[Fig. 6]

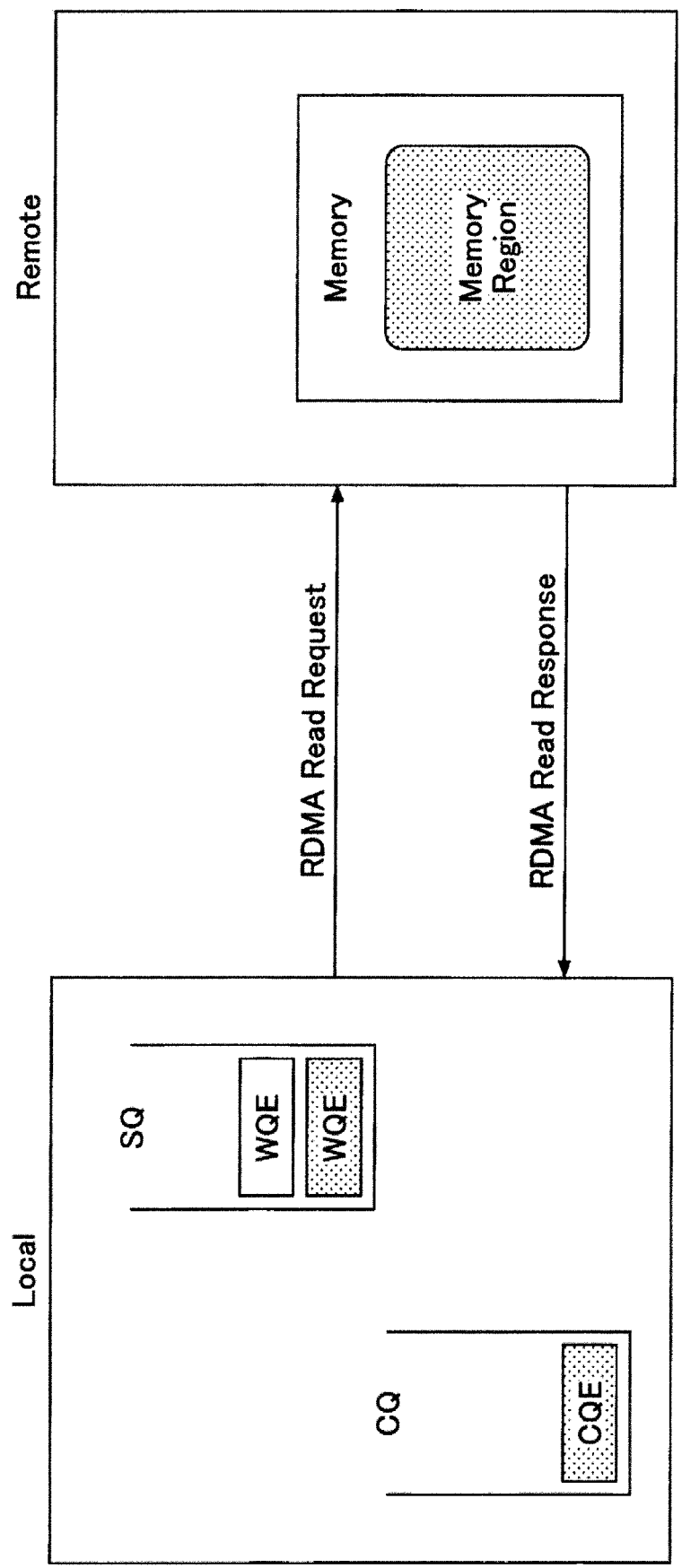
[Fig. 7]

[Fig. 8]
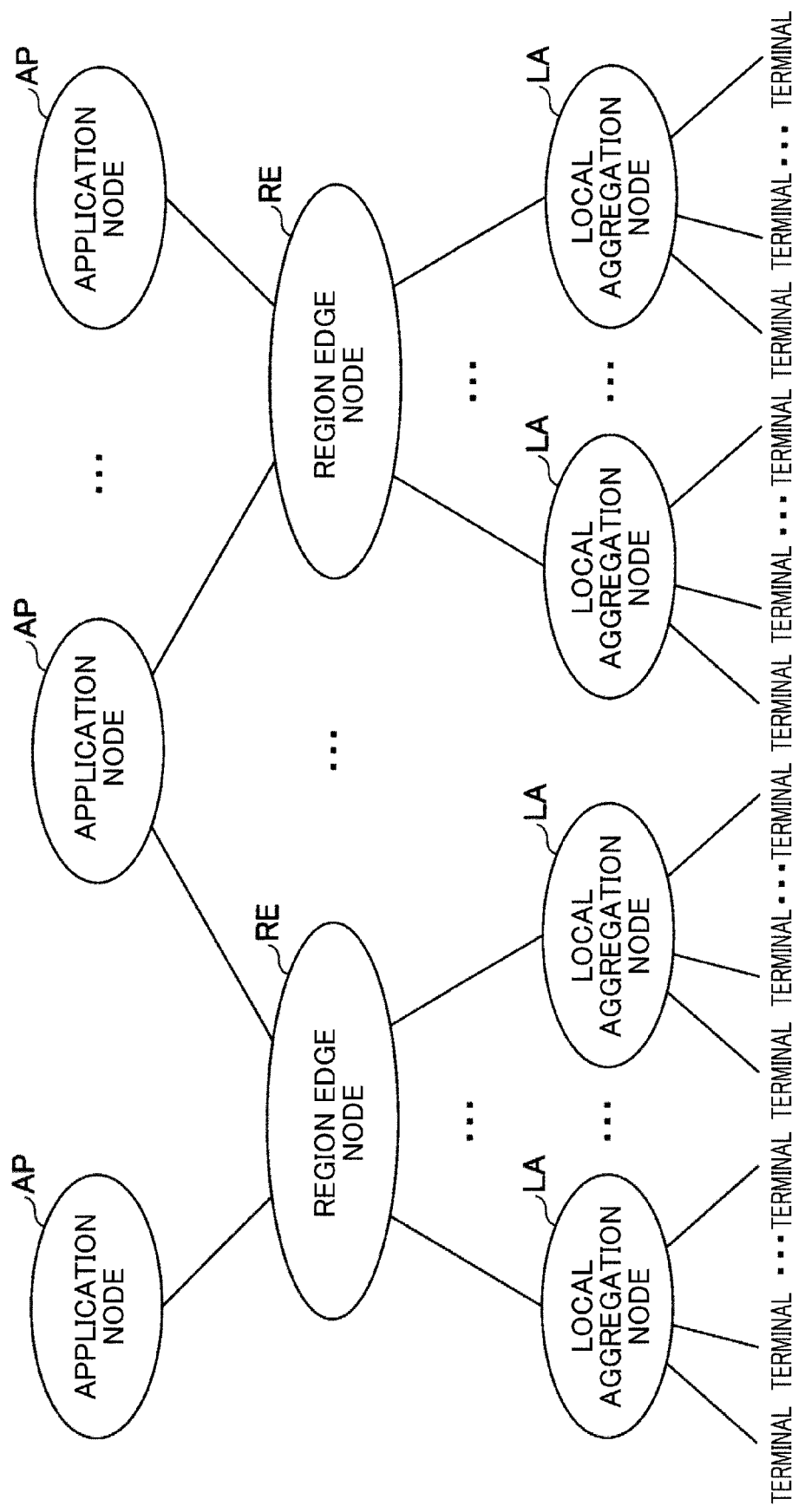

[Fig. 9]
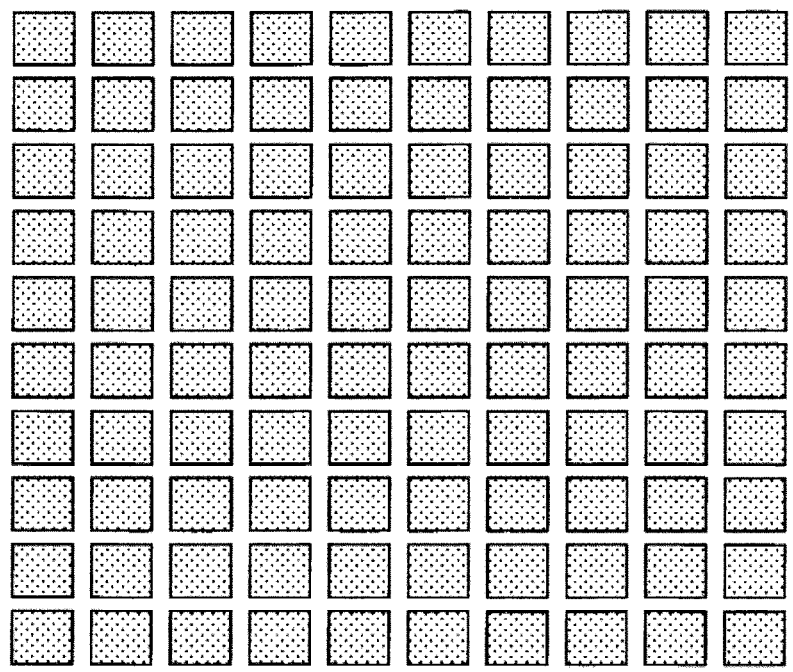

[Fig. 10]
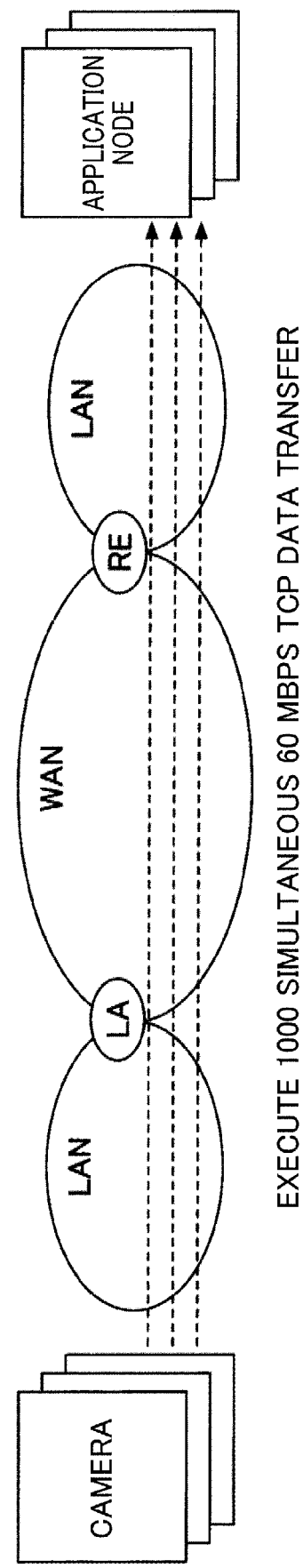

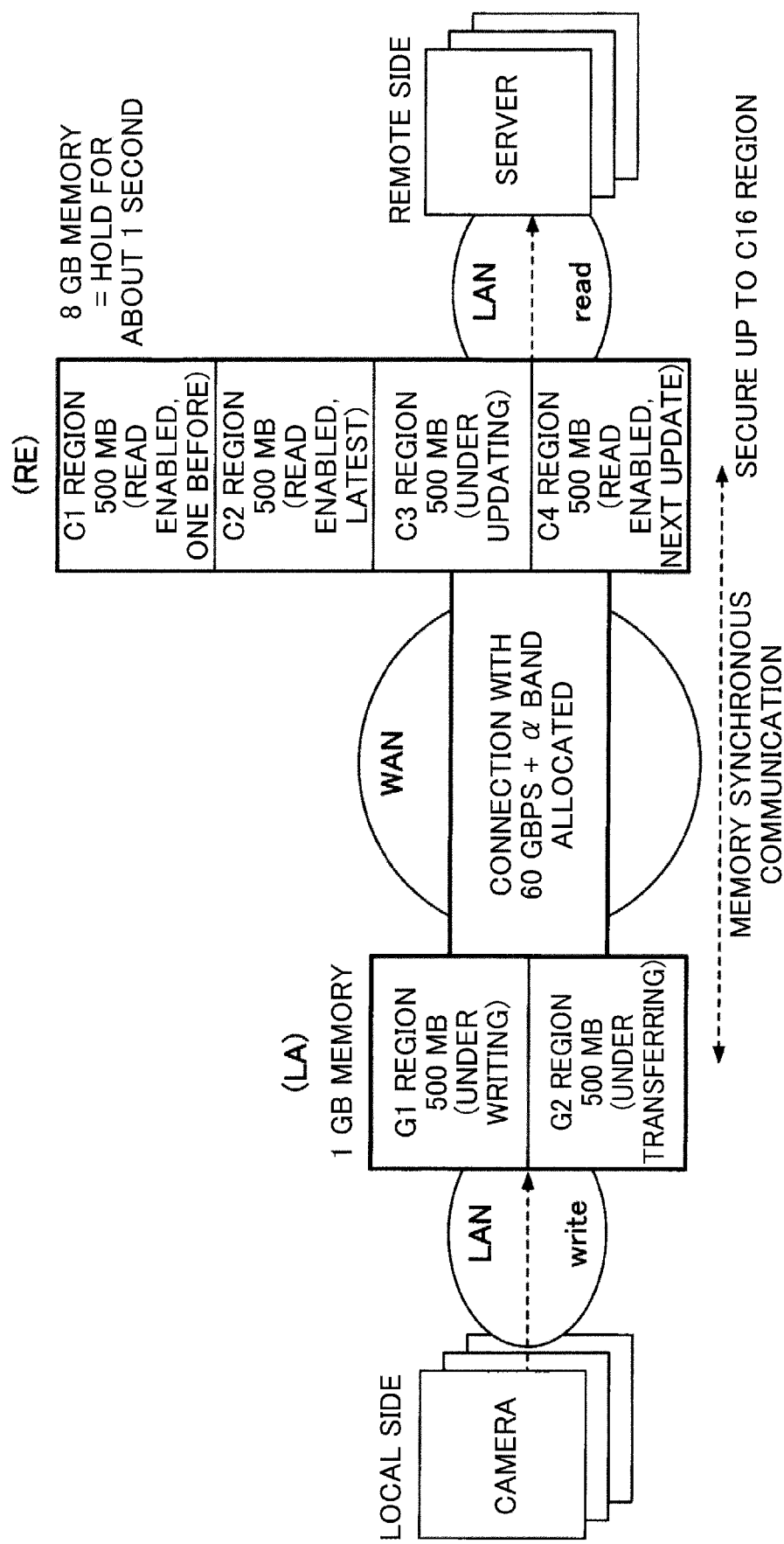
[Fig. 11]

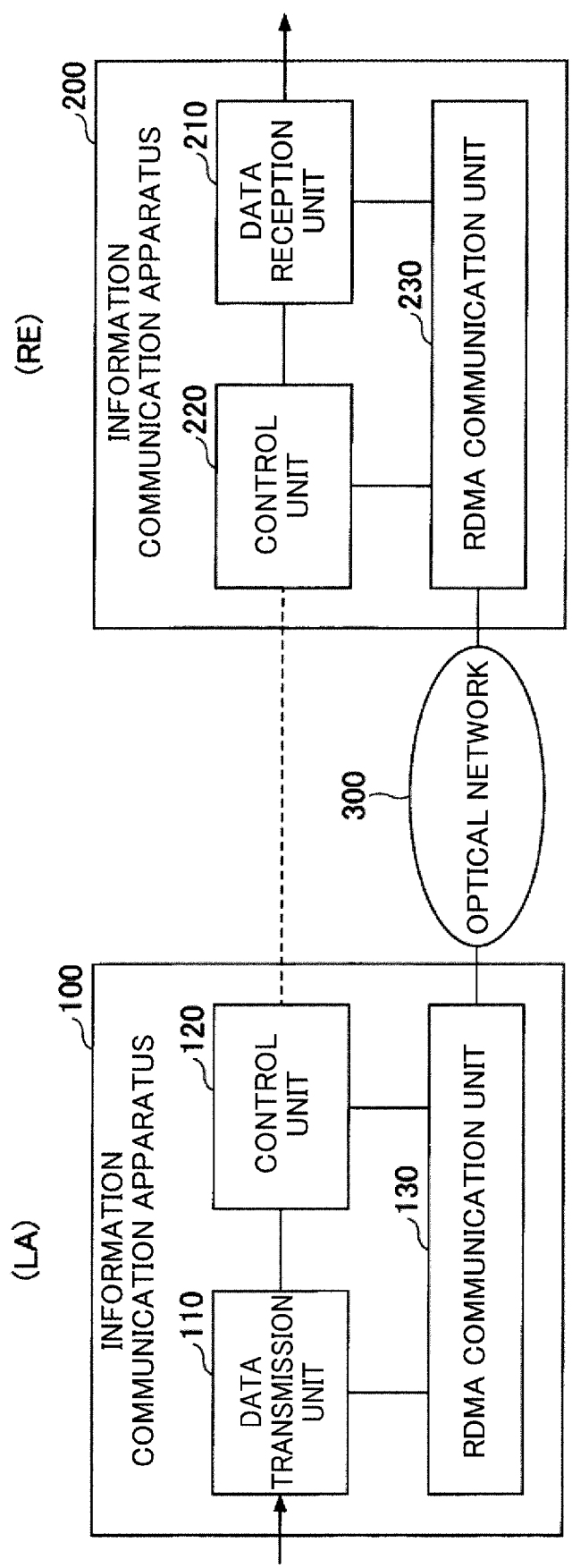
[Fig. 12]

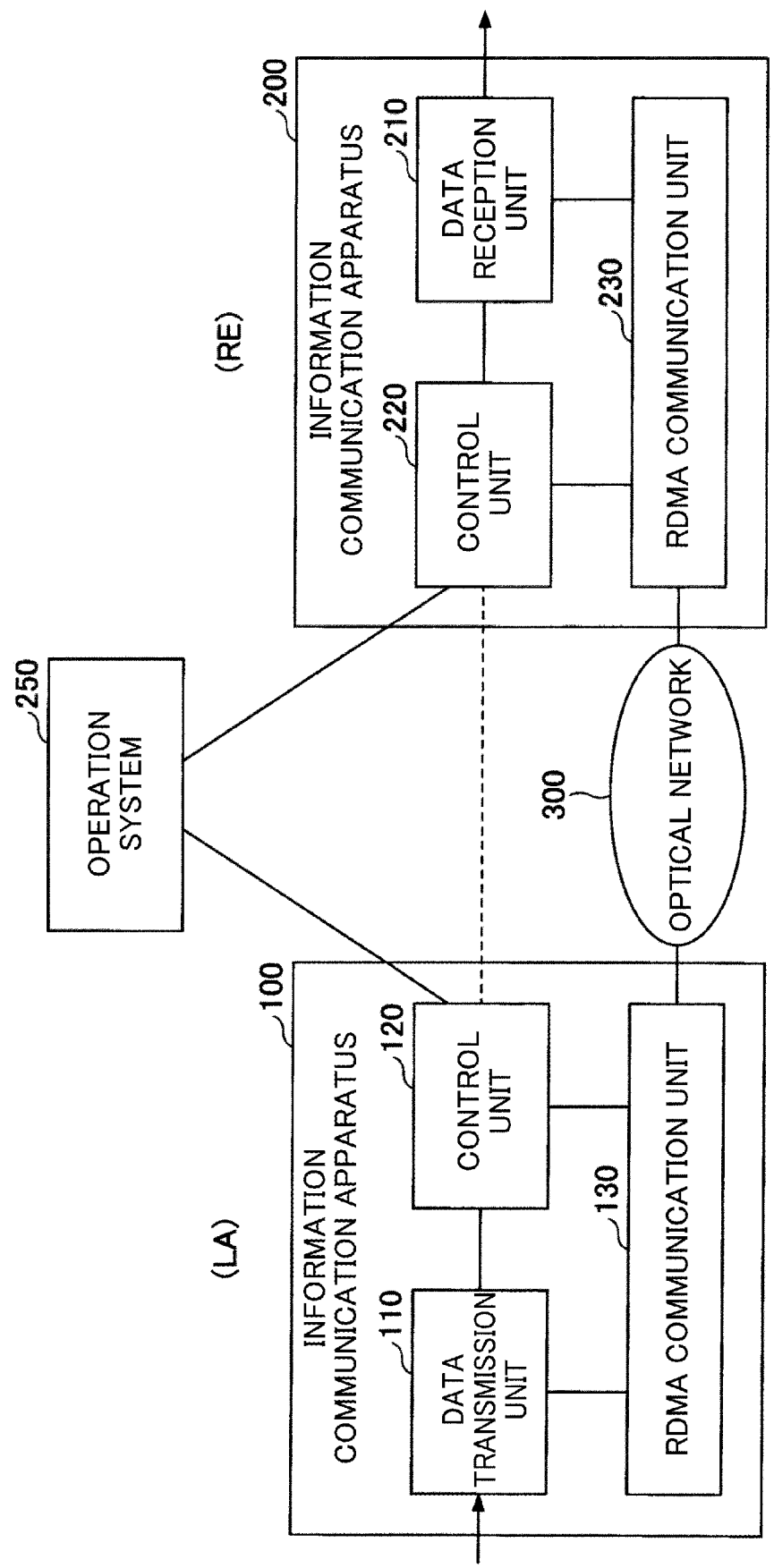
[Fig. 13]

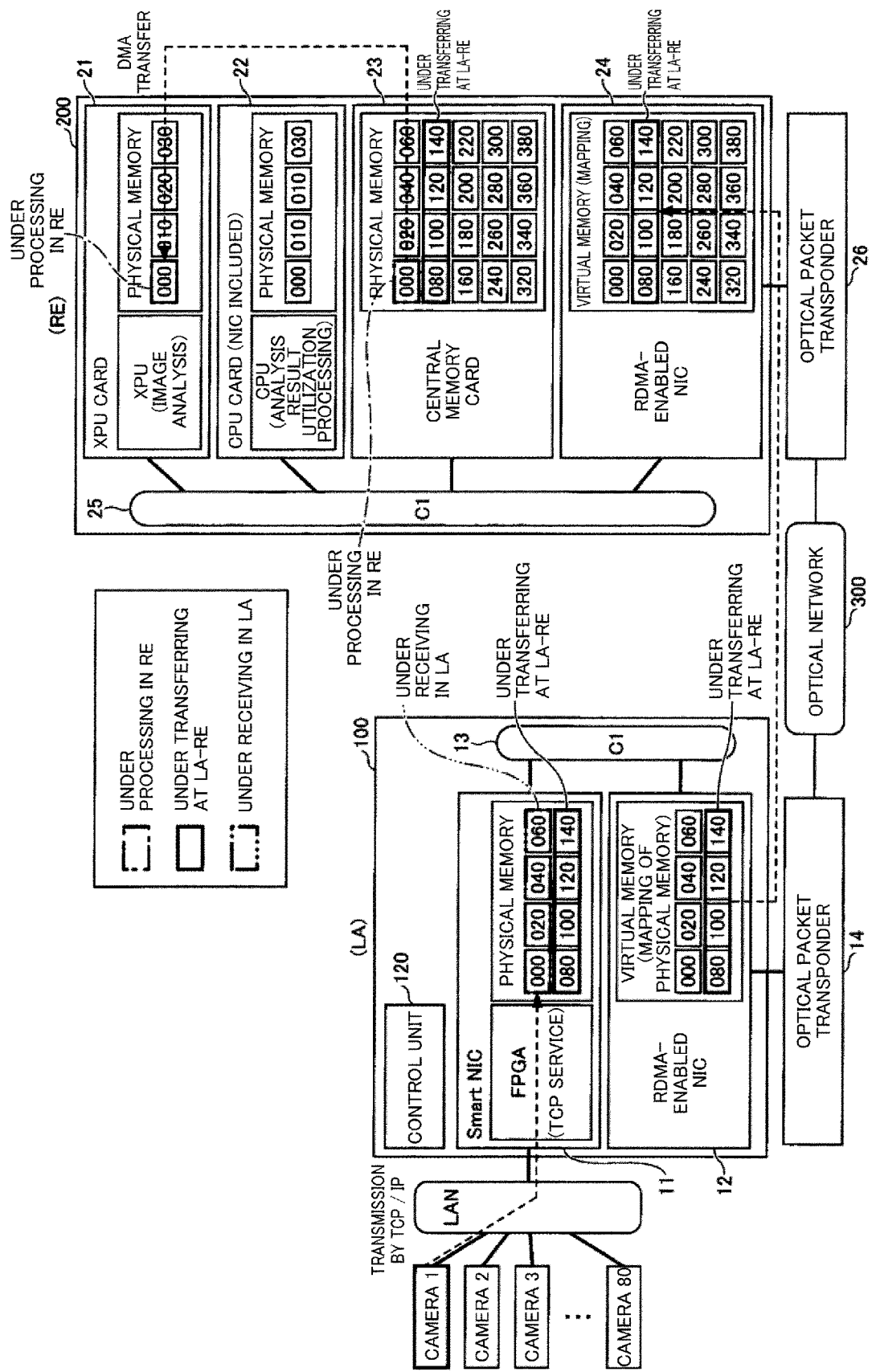
[Fig. 14]

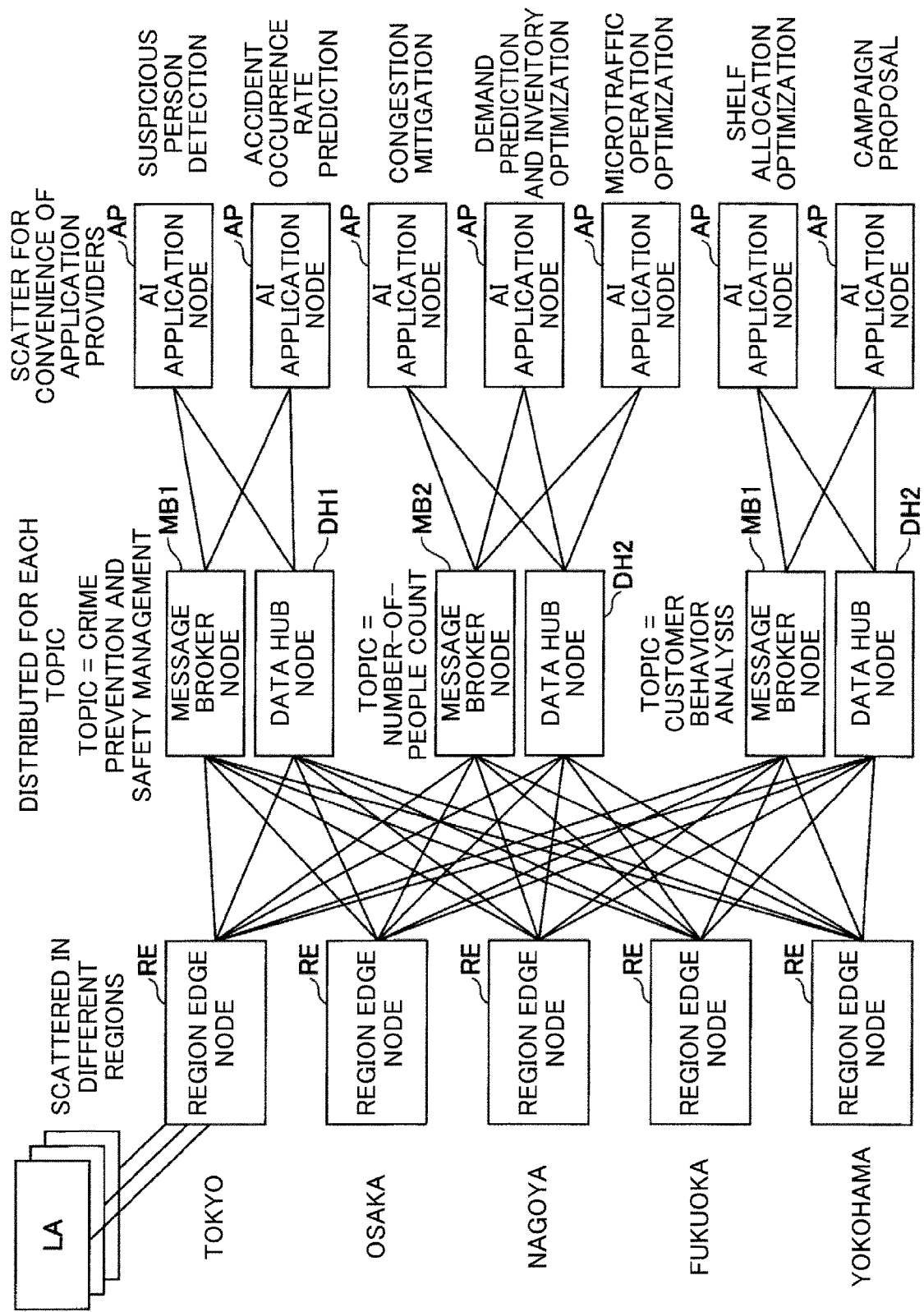
[Fig. 15]

[Fig. 16]
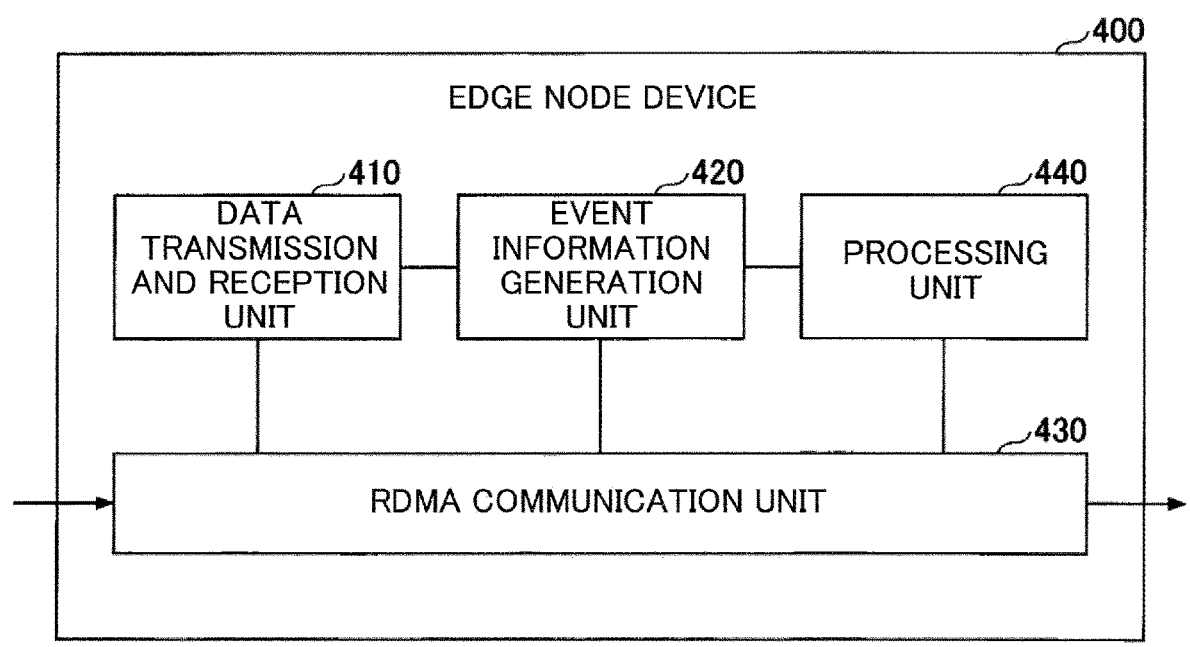

[Fig. 17]
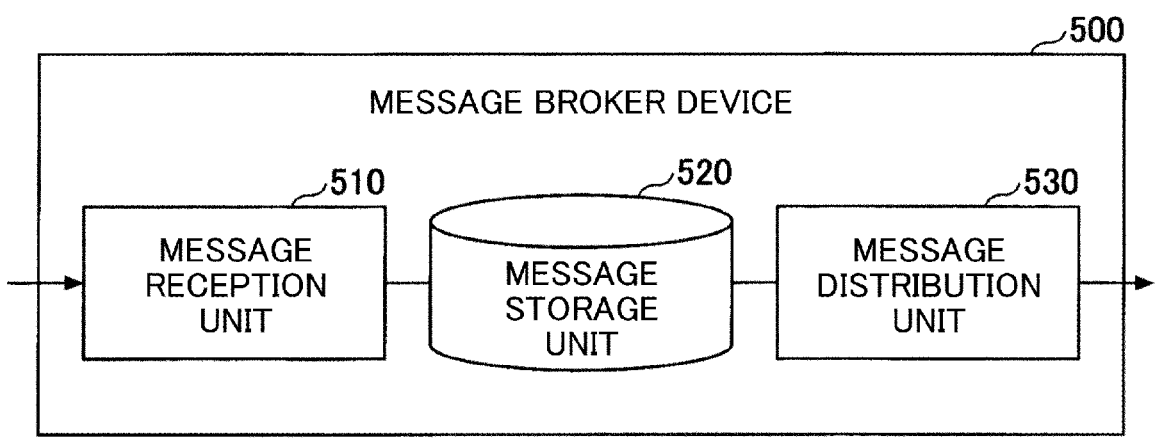

[Fig. 18]
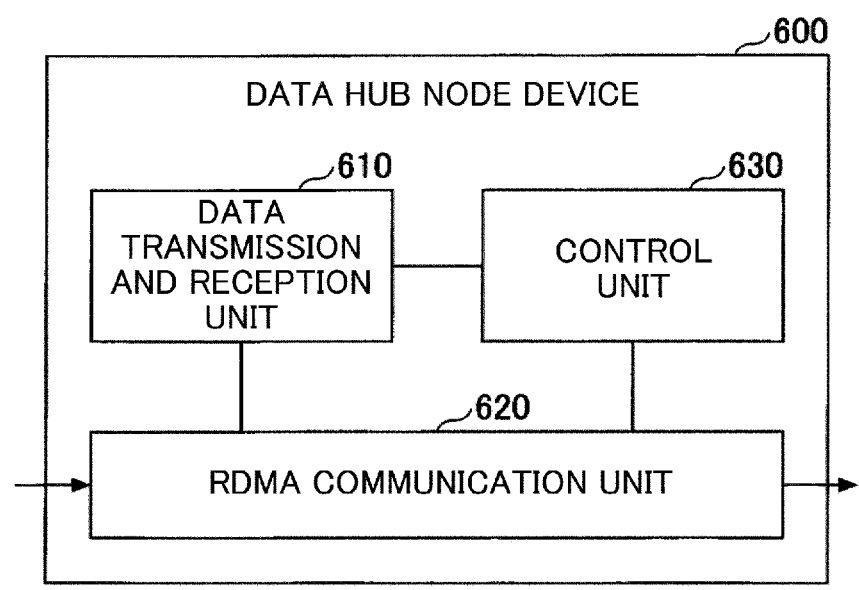

[Fig. 19]
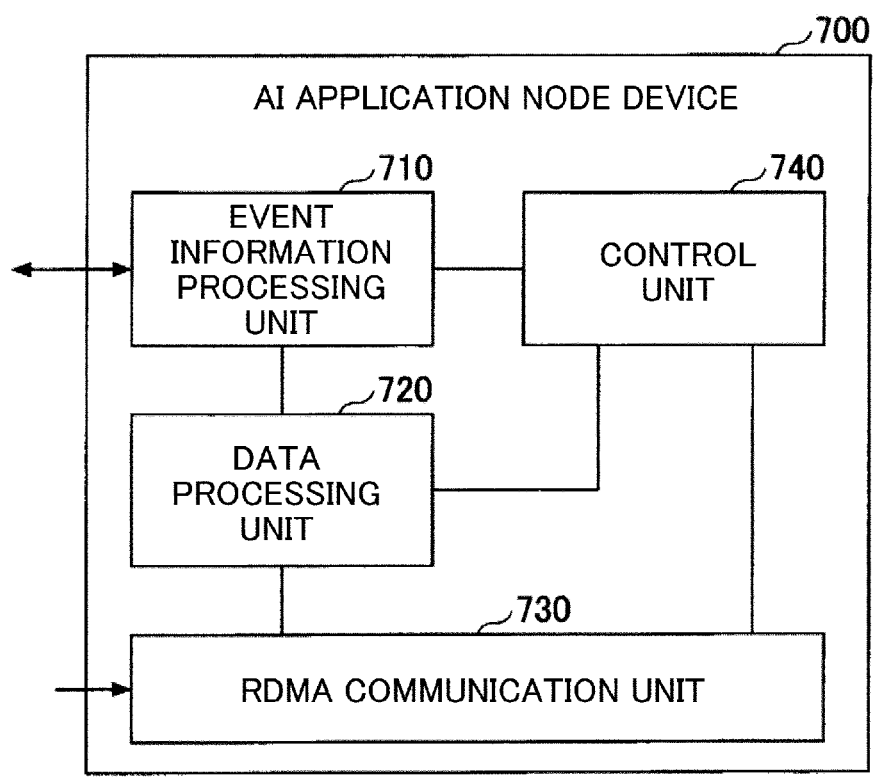

[Fig. 20]
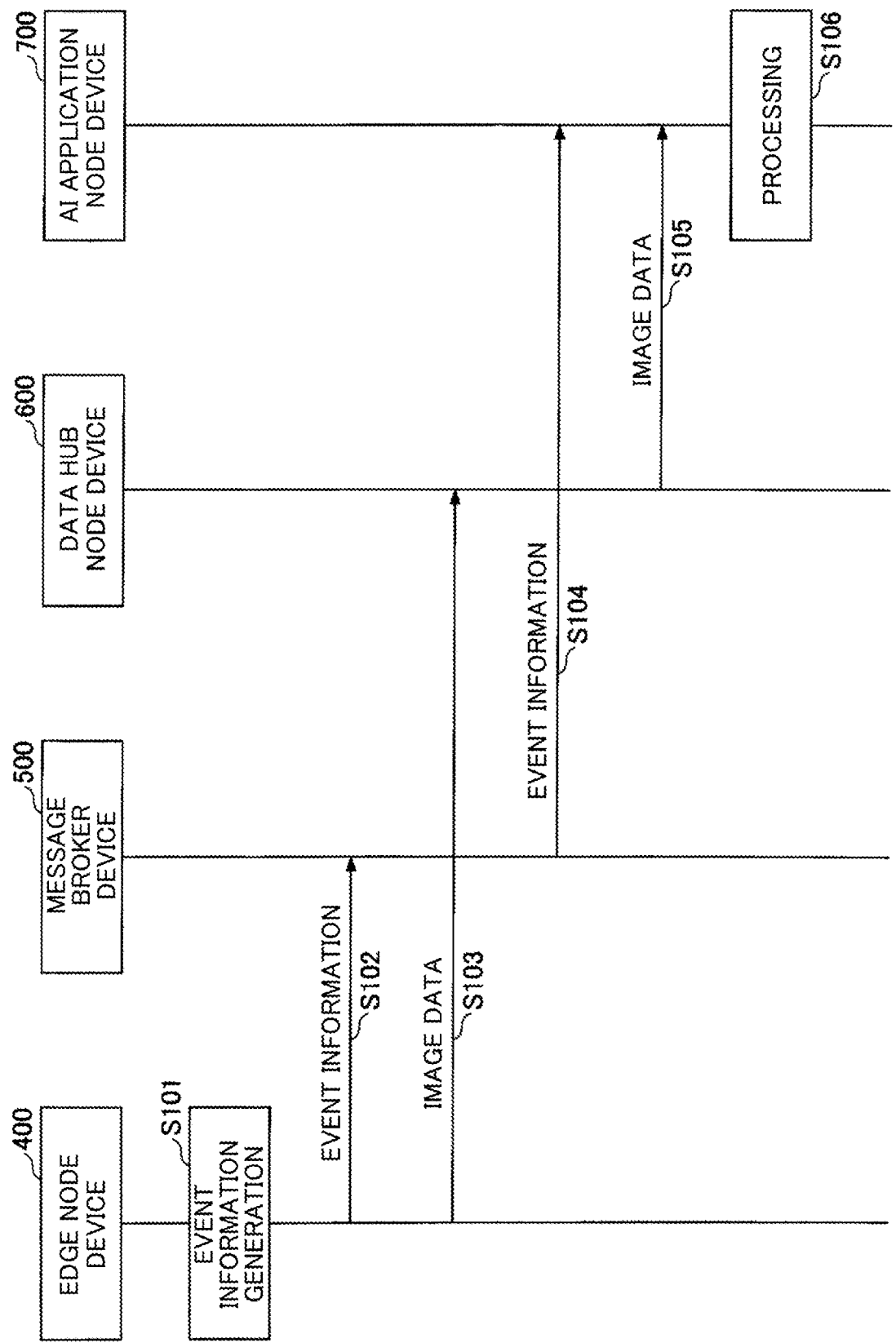

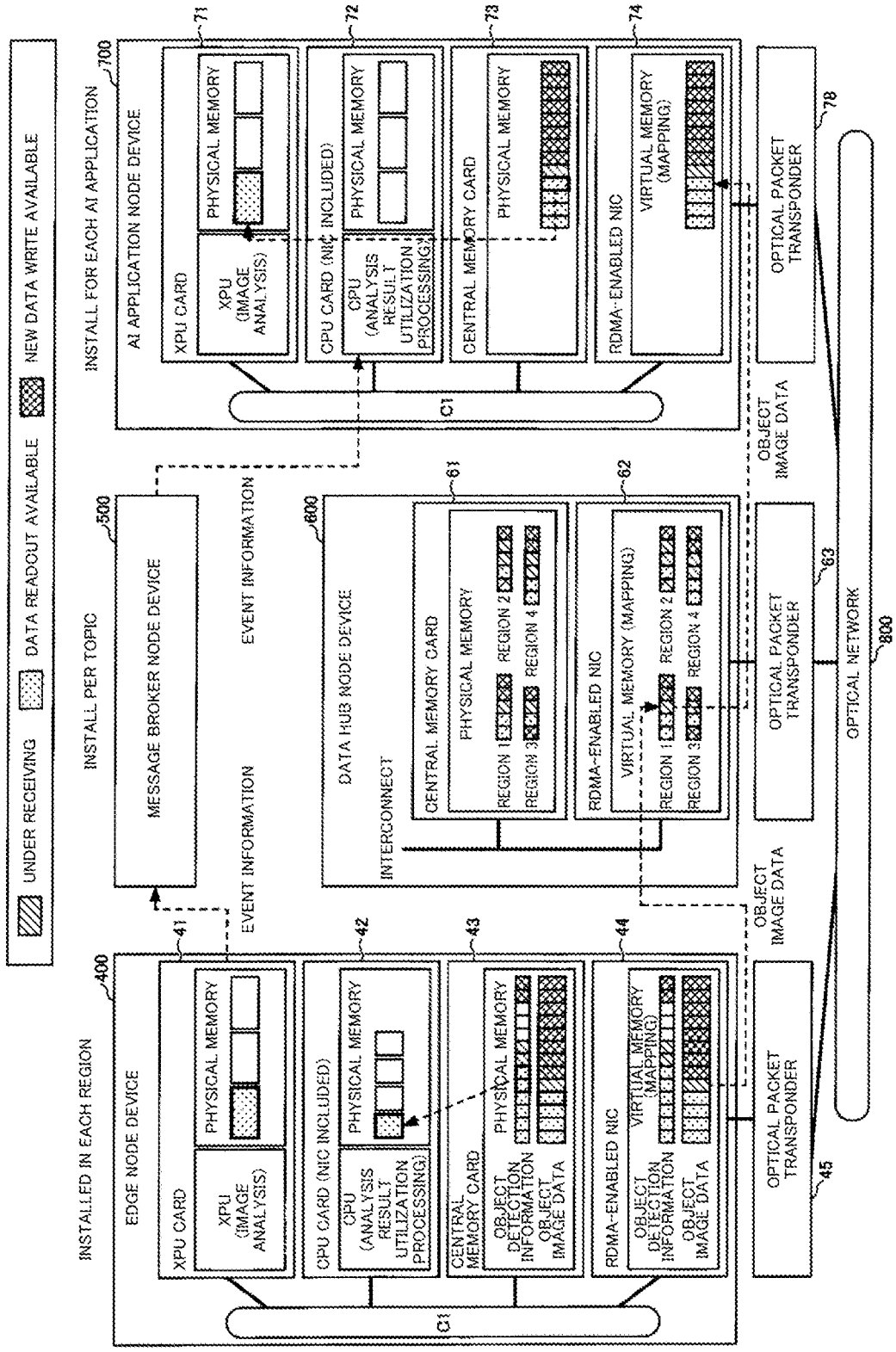
[Fig. 21]

[Fig. 22]
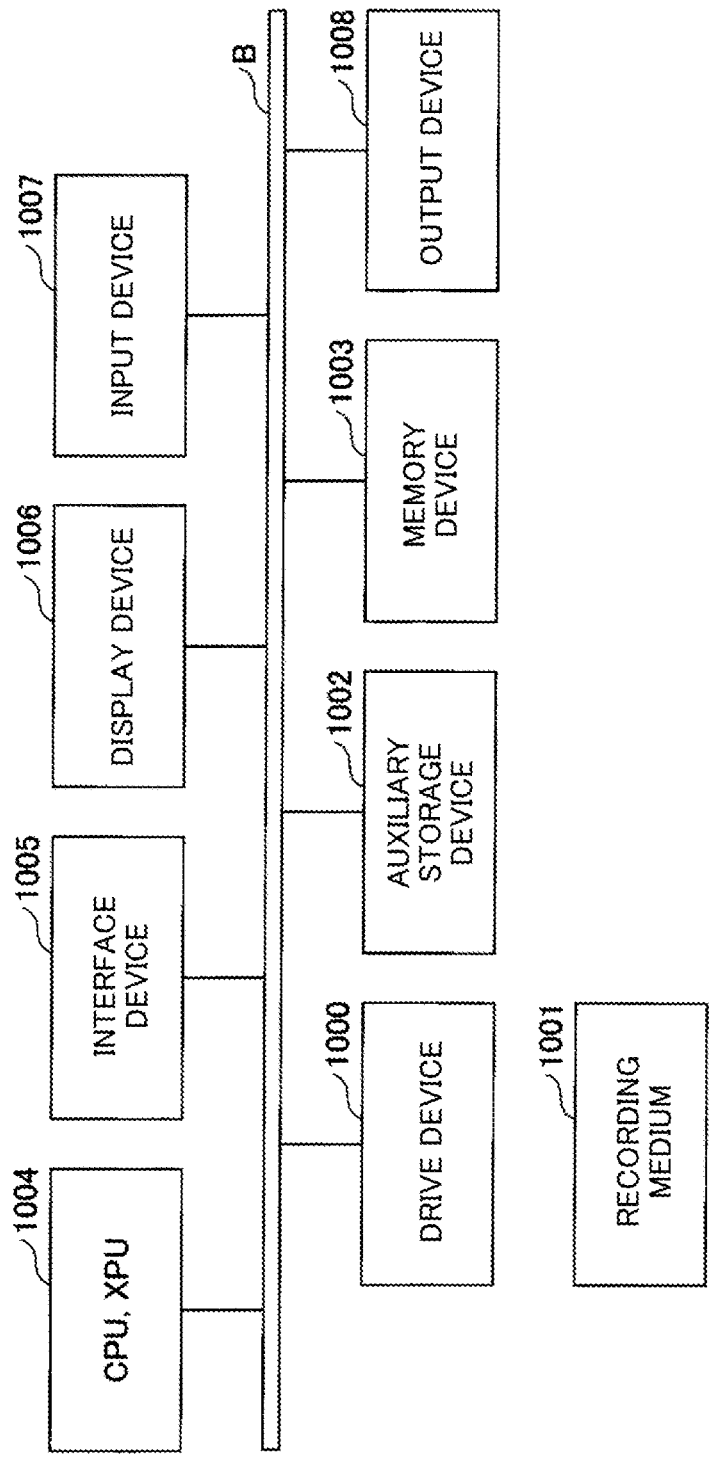

INFORMATION COMMUNICATION APPARATUS, INFORMATION COMMUNICATION METHOD AND PROGRAM

BACKGROUND OF THE INVENTION

1. Field of the Invention

The present invention relates to a technique for transferring data collected from a plurality of terminals.

2. Description of Related Art

In recent years, data such as all kinds of sensor information has been collected, and analyzed to solve various social problems such as crime prevention, accident prevention, congestion, and demand prediction.

For example, a technique for analyzing a surveillance camera image in real time and predicting congestion with high accuracy is disclosed in NFL 1.

CITATION LIST

Non Patent Literature

NPL 1: https://monoist.atmarkit.co.jp/mn/articles/1608/18/news119.htm 1, NTT East GIGA RAKU Camera

BRIEF SUMMARY OF THE INVENTION

Problems to be Solved by the Invention

The problem to be solved by the present invention will be described below.

In the TCP/IP service of the OS layer which is supposed to be used when transferring data to an analysis server or the like in the prior art, optimization of communication according to the size and update rate of data to be transferred is not performed, and flow control is autonomously performed in the OS layer or data buffering is performed. Therefore, if the transfer data becomes huge, the CPU load becomes large. In addition, it takes time to transfer data due to the flow control. Therefore, there is a problem that it is difficult to transfer a large amount of data collected from a plurality of terminals at a high speed and with a low delay.

The present invention has been made in view of the above problems, and an object of the present invention is to provide a technique capable of transferring a large amount of data collected from a plurality of terminals at a high speed and with a low delay without increasing a CPU load in a communication device installed in an aggregation node.

Means for Solving the Problem

According to the disclosed technology, there is provided an information communication apparatus that aggregates data transmitted from a plurality of terminals and transmits the aggregated data to a reception side, the information communication apparatus including:

a determination means that operates in a first layer for determining an update size of a memory area used to hold the data transmitted from the plurality of terminals on a basis of information related to the data; and a setting means that sets a band of a network path of a second layer necessary for communicating with the reception side on a basis of the update size and an update rate of the data.

Effects of the Invention

According to the disclosed technique, there is provided & technique capable of transferring a large amount of data collected from a plurality of terminals at a high speed and with a low delay without increasing a CPU load in a communication device installed in an aggregation node.

BRIEF DESCRIPTION OF THE SEVERAL VIEWS OF THE DRAWINGS

FIG. 1 is a view for explaining an outline of RDMA.
FIG. 2 is a view for explaining an outline of RDMA.
FIG. 3 is a view for explaining an outline of RDMA.
FIG. 4 is a view for explaining an outline of RDMA.
FIG. 5 is a view for explaining an outline of RDMA.
FIG. 6 is a view for explaining an outline of RDMA.
FIG. 7 is a view for explaining an outline of RDMA.
FIG. 8 is a diagram showing an overall configuration example of a communication system according to a first embodiment.
FIG. 9 is a diagram for explaining an image of implementation.
FIG. 10 is a diagram for explaining a problem.
FIG. 11 is a diagram for explaining a realization model.
FIG. 12 is a diagram showing a functional configuration example of a communication system according to a first embodiment.
FIG. 13 is a diagram showing a functional configuration example of a communication system according to a first embodiment.
FIG. 14 is a diagram for explaining an operation example of a communication system in a first embodiment.
FIG. 15 is a diagram showing an example of overall configuration of a data processing system according to a second embodiment.
FIG. 16 is a configuration diagram of an edge node device.
FIG. 17 is a configuration diagram of a message broker device,
FIG. 18 is a configuration diagram of a data hub node device.
FIG. 19 is a configuration diagram of an AI application node device.
FIG. 20 is a diagram explaining an operation example of a data processing system in a second embodiment.
FIG. 21 is a diagram explaining a specific example of a data processing system in a second embodiment.
FIG. 22 is a diagram showing a hardware configuration example of a device.

DETAILED DESCRIPTION OF THE INVENTION

Hereinafter, embodiments of the present invention will be described with reference to the drawings. The embodiment described below is a mere example and embodiments in which the present invention is implemented are not limited to the following embodiment.

Hereinafter, the first embodiment and the second embodiment will be described.

Since both the first embodiment and second embodiment use the RDMA as the data communication method, the outline of the RDMA will be first described. Although the prior art is shown in the outline of the following RDMA for convenience of explanation of the RDMA, it is not necessary that the RDMA used in the present embodiment is the same as the conventional RDMA described below. Any method other than those described in the RDMA overview below may be used, as long as the method allows direct communication between memories without involving the CPO.
(Overview of RDMA)

In the RDMA, hardware (referred to as RDMA-NIC in this embodiment) corresponding to NIC such as Ethernet is used.

The RDMA-NIC on the transmission side reads data from a memory area secured in advance by DMA and transfers the data to the RDMA-NIC on the reception side. The RDMA-NIC on the reception side writes the received data in a memory area secured in advance by DMA. Thus, the user space applications of different nodes can communicate with each other by zero copy. In the RDMA, the protocol of the network is implemented in an RDMA-NIC (hardware), thereby suppressing the consumption of CPU resources of an OS layer in a communication device installed in a node, and achieving low-latency communication.

In the conventional TCP or UDP communication using the network stack of the OS layer, communication is performed by a socket, whereas in the RDMA, communication is performed by queue pair (QP).

The OP is a virtual interface provided by the RDMA-NIC, and consists of a pair of send queue (SQ) and receive queue (RQ). Data related to data transmission and data reception are stored in the SQ and RQ, respectively. This includes an address of a memory area for storing data, information on its length, and the like. A virtual memory address and a physical memory address are used as the memory area.

As shown in FIG. 1, when using RDMA-NIC, the memory region to be accessed by RDMA-NIC is registered with the OS as a memory region. When registering the memory region, a conversion table between virtual memory addresses and physical memory addresses is created and passed to the RDMA-NIC, which enables the RDMA-NIC to recognize a portion of the virtual memory address space of the user program (APP). The RDMA-NIC can determine a physical memory address to be accessed by referring to the conversion table at the time of transmission and reception. Therefore, data transfer can be performed while minimizing the ucc of the CPU of the OS layer in the communication device installed in the node.

As described above, the virtual memory address is used as the memory area by way of example. A physical memory address may be used as the memory area. A memory area using a physical memory address is called PA-MR (Physical Address Memory Region). When the PA-MR is used, a transmission request and reception request including information on a physical memory address of a memory area for storing data and its length is stored in the SQ/RQ, and the physical memory address can be accessed based on the transmission request and reception request.
<Basic Model of Transport Layer>

Next, the communication model of the transport layer in the RDMA between the local node and the remote node will be described with reference to FIG. 2. As shown in FIG. 2, in the transport layer of the RDMA, QP (Queue Pair) is formed between local and remote. As described above, QP is a set of SQ (Send Queue) and RQ (Receive Queue).

The communication unit of the RDMA is a communication request called WR (Work Request), and is loaded in SQ/RQ in a unit of WOE (Work Queue Element). The operation of loading WQ is performed by an instruction from a user program (APP shown in FIG. 1). The operation of transmission/reception in response to a communication request is performed by the RDMA-NIC asynchronously with the operation of loading WQ.

The WR includes a Send WR which is a transmission request and a Receive WR which is a reception request. In the Send WR, the memory area of the data to be transmitted is designated as WOE, and is loaded in the SQ. In the Receive WR, the memory area for which data is to be received is specified in the WQE and loaded into the RQ. The WOE can be loaded in FIFO (First-In-First-Out) by the number of Queue depth of SQ/RQ.

When the processing of WR is normally completed during QP, COE (Completion Queue Entry) indicating normal completion is loaded in CQ (Completion Queue) corresponding to each of SQ/RQ. When the processing of WR is finished due to an error between QP, COE indicating an error is loaded in the CQ. When the COE of the normal completion is confirmed, the WOE of the SQ/RQ is deleted, and the acceptance of the next WR becomes possible.
<Service Type in RDMA, Operation Type>

The service type in RDMA is roughly divided into 4 service types of Reliable Connection (RC), Reliable Datagram (RD), Unreliable Connection (UC), and Unreliable Datagram (UD) according to the classification of Reliable/Unreliable, Connection/Datagram. Among those, RC and UD are commonly used.

The RC guarantees the sequence and reachability of messages by confirming the success and failure of communication by ACK/NAK and a mechanism of retransmission. Also, the Connection type is also used, and one-to-one communication is performed between QP of Local-Remote.

Although UD has no mechanism of acknowledgment or retransmission, it is different from RC, it is possible to perform multi-to-multi-way communication such as transmission to a plurality of QPs and reception from a plurality of QPs by designating a destination for each communication.

The operation types in the RDMA are roughly classified into four operation types, that is, SEND, RDMA WRITE (write Immediate), RDMA READ, and ATOMIC operations. All of these can be used in RC, and only SEND can be used in UD. Even in the Same operation type, the way of stacking WOE and CQE is different depending on the service type.

In the RDMA communication in the present embodiment (the first embodiment and the second embodiment), any service type and operation type can be used. Each operation type will be described below.
<SEND Operation Method (RC)>

FIG. 3 shows an overview of operation of the SEND operation method (RC). The SEND operation method (RC) is a basic transmission and reception model of RDMA, and a model in which the Local side transmits data to the Remote side.

As shown in FIG. 3, SQ is prepared on the Local side, RQ is prepared on the Remote side, and WQE is stacked on each of the SQ and RQ. The Local side takes out the WOE of the SQ from the beginning, and transmits the data of the memory area designated therein by the SEND Only.

As for the data received by the Remote side, the WOE of RQ is taken out from the beginning and stored in the memory area designated therein. When the reception is successful, the COE is loaded in the CQ corresponding to the RQ, and the ACK is returned to the Local side. When the Local side receives the ACK, the COE is loaded and the WQE of the SQ is released.

<SEND Operation Method (UD)>

FIG. 4 shows an overview of operation of a SEND operation method (UD). The SEND operation method (UD) is different from the send of RC, and is a method of not performing a confirmation response. As shown in FIG. 4, SQ is prepared on the Local side, RQ is prepared on the Remote side, and WQE is loaded in each of the so and RQ. When the communication is ready, the Local side transmits data by the SEND Only. When the transmission of the data is completed, the CQE is loaded in the CQ corresponding to the SQ. When the reception is successful on the Remote side, the CQE is loaded in the CQ corresponding to the RQ.

<RDMA WRITE Operation Method (RC)>

FIG. 5 shows an overview of operation of the RDMA WRITE operation method (RC). The RDMA WRITE operation method (RC) is a method in which the Local side transmits data to the Remote side as in the SEND, but is different from the SEND in that the data is directly transferred to the memory area of the Remote.

The Local side prepares SQ and loads WOE. At this time, the WQE designates a memory area on the Remote side to which writing is desired in addition to a memory area of data to be transmitted. The Remote side secures a memory area (Memory Region) for RDMA, but does not need to load WOE into the RQ.

When the communication is ready, the Local side transmits data by RDMA Write. The data is directly written in the memory area on the Remote side. When the reception is successful on the Remote side, the ACK is returned to the Local side. When the Local side receives the ACK, the COE is loaded and the WOE of the so is released.

<RDMA WRITE w/Imm Operation Method (RC)>

FIG. 6 shows an overview of operation of the RDMA WRITE w/Imm operation method (RC). In the RDMA WRITE described with reference to FIG. 5, there is a disadvantage that the Remote side cannot detect a change in the memory area when data is received.

On the other hand, in the RDMA WRITE w/Imm (RDMA WRITE with Immediate) system shown in FIG. 6, RQ and WOE are set on the Remote side, and the CQE at the time of successful reception of the RDMA WRITE is waited for to cope with this.

In the WQE of the SQ on the Local side, a special field imm_data is set in addition to a memory area of data to be transmitted and a memory area on the Remote side to be written. When the reception is successful on the Remote side, the CQE including imm_data is loaded in the CQ corresponding to the RQ. By using this, it is possible to detect a change in an arbitrary memory area.

<RDMA WRITE Operation Method (RC)>

FIG. 7 shows an overview of the RDMA READ operation method (RC). As shown in FIG. 7, the RDMA READ operation method (RC) is a system in which data is drawn from the Remote side to the Local side.

The Local side prepares a SQ and loads a WQE. At this time, a memory area to which data is desired to be received is designated as the WOE. Furthermore, a memory area on the Remote side to be read is also designated. The Remote side secures a memory area (Memory Region) for the RDMA, but does not need to load the WOE into the RQ.

When the communication is ready, the Local side requests data reading by the RDMA Read Request. When the Remote side receives this, it directly sends the data of memory area of the Remote side to the set Local side's memory area by RDMA Read Response. The packet of the RDMA Read Response includes an ACK extension header, and when the Local side receives the ACK, the COE is loaded and the WQE of the SQ is released.

Hereinafter, the first embodiment and the second embodiment will be described.

First Embodiment

First, a first embodiment will be described. FIG. 8 illustrates an overall configuration example of a communication system according to the first embodiment.

As shown in FIG. 8, the communication system includes a local aggregation mode (LA) connecting a plurality of terminals, a region edge node (RE) connecting a plurality of local aggregation nodes (LA), and an application node (AP) are provided.

In the first embodiment, it is assumed that the terminal is a camera. It is assumed that the region edge node (RE) is installed in each region such as Tokyo and Osaka. A plurality of local aggregation nodes (LA) exist for each region, and each local aggregation node (LA) accommodates a plurality of terminals (for example, cameras). Each node is connected, for example, by an optical network.

Overview of Operation, Problem, or the Like

In a first embodiment, it is envisaged that the system configuration shown in FIG. 8 constitutes, for example, a multi-camera multipurpose AI platform. Note that such assumption is the same in a second embodiment.

Specifically, in the platform, a large number of cameras are installed in a commercial building or an office building, and image data collected from the cameras are analyzed. As the content of the analysis, for example, the number of people present in an area is counted, and is useful for congestion avoidance, evacuation guidance, and the like. Also, the number of persons including attributes is counted, so that demand prediction, stock and store clerk arrangement optimization, analysis of effects of events, or the like, and the planning of the event and advertisement can be performed. Further, by detecting a person who has a suspicious behavior, it is useful for crime prevention.

Also, in view of the next-generation town development, a large number of cameras are installed on a road, so that automatic control of a Micromobility vehicle, prevention of an encounter collision at an intersection, and it is also possible to realize automatic allocation of a Micromobility vehicle to a place with many people, and so on.

More specifically, as shown in FIG. 9, for example, a block of 500 m×500 m having a road in a lattice shape with 50 m width is assumed, and cameras are installed at every 10 m interval in the following specifications.

Connection Method: Wired Ethernet (Registered Trademark)

Resolution: Full HD (2 MB in Raw)

Frame rate: 15 FPS

Coding: Motion JPEG 60 Mbps

Since there are 20 roads and 50 cameras are installed in one road, the total number of cameras is about 1000. When the outputs from all the cameras are merged, 60 Gbps and 15000 FPS are obtained. The total rate of 60 Gbps is calculated by 1 frame of 500 kB×1000 cameras×15 FPS.

This data is input to, for example, one local aggregation node (LA) shown in FIG. 8. FIG. 10 shows an image of a flow of data from the camera to the application node (AP) via the local aggregation node (LA) and the region edge node (RE). As shown in FIG. 10, 60 Mbps TCP data transfer is executed at the same time by 1000 cameras.

For example, it is conceivable to realize the above data transfer by installing an information communication apparatus for operating a program for transmitting and receiving data by a CPO while utilizing the TCP/IP service of the OS layer in the LA and RE. However, the TCP/IP service of the OS layer autonomously performs flow control in the OS layer without optimizing communication according to the size and update rate of data to be transferred, and buffers the data.

Therefore, in the example of data transfer as shown in FIG. 10, if the amount of transfer data becomes large, the CPU load becomes large, and the data transfer takes time for the flow control.

Although load distribution can be achieved by constructing a load distribution layer, a considerable number of servers are required for the load distribution layer, a CPU load as the whole system increases, and latency increases by the amount of the load distribution layer.

Therefore, in the first embodiment, as a communication method between LA and RE, an RDMA capable of directly performing data communication between memories is used. That is, each of the local aggregation node (LA) and the region edge node (RE) is provided with an information communication apparatus provided with the RDMA-NIC. In the information communication apparatus, the virtual memory area of the RDMA is secured (registered) in accordance with the size of the collected data, and the network band is allocated in accordance with the size of the virtual memory area and the update rate. This allocation can be dynamically performed. As a method for dynamically allocating a network band, there is, for example, the following method. The following methods are examples, and other methods may be used.

In the layer of the physical layer of light, the number of wavelengths of light is dynamically changed.

In the layer (layer 1) of the transmission device, a frame change in OTN, a band change in finer granularity by ODUFlex, a speed step change in SONET/SDH, and a rate change in finer granularity by VC (Virtual Connectivity) are performed.

In a higher layer, band control by a traffic engineering function is performed by MPLS-TE and RSVP-TE.

In a protocol in which the transmission speed is increased by the number of streams in parallel at the same time, parallelism adjustment in data transfer is performed.

Not band control in the network, but band control or the like is performed by a traffic shaper or the like in the transfer node.

FIG. 11 illustrates an example of communication using RDMA between a local aggregation node (LA) and a region edge node (RE) under the assumption of the camera arrangement described above. FIG. 11 shows a memory used by RDMA in each of the local aggregation node (LA) and the region edge node (RE).

As mentioned above, the total rate of 60 Gbps is one frame 500 kB×camera 1000×15 FPS, and 1000 cameras are within 500 MB. Then, the information communication apparatus on the local (ground) side secures a memory area of 500 MB. However, since it is necessary to write the image data of the next frame into the memory during data transfer on the Local side, an area for writing the memory, an area for transferring the memory, Two regions are generated in combination. That is, as shown in FIG. 11, two memory areas, namely, a 500 MB memory area as a G1 area and a 500 MB memory area as a G2 area, are generated. Each memory area is updated at 15 Hz. Note that at least 2 memory areas may be secured.

In an information communication apparatus of a region edge node (RE) on the remote (cloud) side, it is assumed that data is held for a certain time for data analysis or the like when data is transferred to an application node.

Therefore, in the information communication apparatus of the region edge node (RE), the necessary number of memory areas are generated in accordance with the data holding time. For example, if the data holding time is 1 second, 16 (=15+1) memory areas are secured. In the example of FIG. 11, 4 regions of the C1 region to the C4 region are secured.

In a network between LA and RE, a network band (60 Gbps+α) is allocated in accordance with a total rate of 60 Gbps of data. Here, α represents allocation of a band with a margin, and it is sufficient to allocate a header overhead according to a protocol to be coupled and to the extent of including other control messages, for example, about 10%.

When the RDMA communication of 60 Gbps cannot be realized in a pair of RDMA nodes, a plurality of memory synchronizations may be run in parallel by dividing the memory area. In this case, for example, label multiplexing or the like may be performed to share the optical path.

<Device Configuration>

FIG. 12 is a diagram showing functional configurations of the information communication apparatus 100 on the LA side and the information communication apparatus 200 on the RE side. The information communication apparatus 100 and the information communication apparatus 200 are connected to each other via an optical network 300.

As shown in FIG. 12, the information communication apparatus 100 on the LA side includes a data transmission unit 110, a control unit 120, and an RDMA communication unit 130. The data transmission unit 110 and the control unit 120 are functional units implemented by a CPU, an FPGA, a physical memory, a user program, and the like. The RDMA communication unit 130 corresponds to an RDMA-NIC.

A data transmission unit 110 receives data from the terminal side, stores the data in a physical memory, and issues a transmission instruction to an RDMA communication unit 130. The sending of the transmission instruction corresponds to the loading of the transmission request in the transmission queue in the RDMA communication unit 130.

The control unit 120 determines the size and update rate of data to be transferred, by monitoring the data transmission unit 110 or by acquiring information on the terminal side. The control unit 120 determines the size of a memory area used by the RDMA communication unit 130 on the basis of the size of the data, and secures the memory area of the size. The secured size of the memory area is referred to as an update size because each of consecutive data is obtained (that is, updated) using the memory area of the size as one unit of update. The control unit 120 also determines a band of a network path for performing data communication between LA and RE by the RDMA communication on the basis of the size and update rate of the data, and secures the band.

That is, the control unit 120 includes a determination means that operates in the first layer that determines the update size of the memory area used to hold the data on the basis of information on the data transmitted from the plurality of terminals, and a setting means that sets the band of the network path of the second layer necessary for communication with the reception side on the basis of the update size and the update rate of the data. Since the layer of the size determination processing and the layer of the processing related to the RDMA communication are different from each other, they are called first and second layers.

The information (data size, update rate, or the like) grasped by the LA side control unit 120 is notified to a control unit 220 of the RE side information communication apparatus 200, and the control unit 220 performs processing such as securing a memory area to the RDMA communication unit 230.

For grasping the size and the update rate of the data, for example, the control unit 120 can grasp the number of terminals, and the amount of data transmitted from each terminal at the update rate on the basis of the received data. As illustrated in FIG. 13, the operation system 250 may be provided, and each of the control unit 120 and the control unit 220 may receive explicit information such as the number of terminals, and the update rate and the data size of data transmitted from each terminal from the operation system 250 to grasp the size and the update rate of data.

As shown in FIGS. 12 and 13, information communication apparatus 200 of the RE side includes a data reception unit 210, a control unit 220, and an RDMA communication unit 230. The data reception unit 210 and the control unit 220 are functional units implemented by a CPU, an XPU, a physical memory, a user program, and the like. The RDMA communication unit 230 corresponds to RDMA-NIC. Here, various processor units such as GPU are generally called XPU.

A data reception unit 210 receives data from the LA side through an RDMA communication unit 230, stores the data in a physical memory, and executes data processing by, for example, XPU.

The data reception unit 210 may acquire data from the LA side by executing the RDMA READ operation and store the data in the physical memory. Thus, it is possible to cope with a case where the LA side is relatively powerless in terms of equipment configuration.

As described above, the data reception may be executed mainly by either the LA side or the RE side.

The control unit 220 grasps the size and update rate of data on the basis of information received from the RE side control unit 120 or the operation system 250, and secures a memory area used by the RDMA communication unit 230 on the basis of the grasped information, and securing a network band. The control unit 220 calculates a time for holding data in the RE on the basis of the data processing time or the like, and secures memory areas of the number corresponding to the data holding time.

Detail Example

Next, an example of the detailed configuration and the detailed operation of the first embodiment will be described with reference to FIG. 14. In the communication system shown in FIG. 14, an information communication apparatus 100 is provided on the LA side, and an information communication apparatus 200 is provided on the RE side. In the example shown in FIG. 14, one LA is connected to a RE, but this is an example, a plurality of LAs can be connected. The information communication apparatus 100 in the LA may be called a proxy server. This is because the information communication apparatus 100 has a function of enabling RDMA communication on the network even when a terminal (camera or the like) does not support RDMA.

An optical packet transponder 14 is connected to the information communication apparatus 100, and an optical packet transponder 26 is connected to the information communication apparatus 200. The optical packet transponder 14 and the optical packet transponder 26 are connected by an optical network 300. An optical packet transponder 14 on the LA side converts an electric signal outputted from an RDMA-NIC 12 of the information communication apparatus 100 into an optical signal and transmits the optical signal. An optical packet transponder 26 on the RE side converts an optical signal received from the optical network 300 into an electric signal, and transmits the electric signal to an RDMA-NIC 24 of the information communication apparatus 200.

Further, 80 cameras are connected to the information communication apparatus 100 on the LA side via a LAN. It is assumed that even if the data transfer from the camera is TCP/IP, it is assumed that the communication is at most several hundred meters, so that high-speed data transfer is possible.

In FIG. 14, in order to facilitate the explanation of the state of the memory area, each of the information communication apparatus 100 and the information communication apparatus 200 has a configuration close to physical mounting.

That is, the information communication apparatus 100 is provided with a control unit 120, a smart NIC 11, and an RDMA-NIC 12, and the smart NIC 11 and the RDMA-NIC 12 are connected by a CI (Component Interconnect) 13.

The smart NIC 11 includes an FPGA and a physical memory. The FPGA has a TCP service function, receives data outputted from the cameras 1-80 and stores the data in a memory area secured by a control unit 120 in a physical memory.

The RDMA-NIC 12 is hardware for performing the RDMA communication as described above. FIG. 14 shows a memory area of a virtual memory which is a mapping of a physical memory.

A control unit 120 designates a virtual memory address corresponding to the memory area, and thereby the information communication apparatus 100 secures the memory area to be accessed by the RDMA-NIC 12. Since the virtual memory is a mapping of the physical memory, the memory area secured by the control unit 120 is both a memory area in the virtual memory and a memory area in the physical memory.

The information communication apparatus 200 includes a control unit 220, an XPU card 21, a CPU card 22, a central memory card 23, and an RDAM-NIC 24, and then the XPU card 21, the CPU card 22, the central memory card 23, and the RDAM-NIC 24 are connected by a CI 25.

The XPU card 21 includes, for example, an XPU for performing image analysis and a physical memory. The CPU card 22 is provided with a CPU and a physical memory for performing the utilization processing of the analysis result. The central memory card 23 is provided with a physical memory.

The central memory card 23 may be a high-speed storage on a so-called mother board in the PC architecture or an independent storage such as an NVME Array. The physical memory can be used without increasing a CPU load by DMA-transferring data from the RDMA-NIC 24 to the physical memory on the central memory card 23 (mother board) without interposing a CPU. Further, a plurality of central memory cards may be made of a RAID configuration to achieve high performance and RA.

In the case where the NVME array is used as the central memory card 23, it may be connected to the functional unit of the computing system at a high speed by interconnect.

The RDMA-NIC 24 is hardware for performing the RDMA communication as described above. FIG. 14 shows a memory area of a virtual memory which is a mapping of a physical memory. As described above, the control unit 220 designates the virtual memory address corresponding to the memory area, thereby securing the memory area to be accessed by the RDMA-NIC 12 in the information communication apparatus 200. Since the virtual memory is mapping of the physical memory, a memory area secured by the control unit 220 is a memory area in the virtual memory or a memory area in the physical memory.

When the number of cameras connected to the information communication apparatus 100 is increased, a control unit 120 in the information communication apparatus 100 on the LA side increases a memory area to be accessed by the RDMA-NIC 12 and a connection band between LA and RE at the same rate, on the contrary, when the number of cameras is reduced, the memory area to be accessed by the RDMA-NIC 12, a connection band between LA and RE is increased or decreased depending on the increase or decrease in the number of cameras. The amount of memory areas and the connection band information determined by the control unit 120 are also notified to the control unit 220 of the information communication apparatus 200 on the RE side, and the control unit 220 increases or decreases the memory area to be accessed by the RDMA-NIC 24 and the connection band between the LA and RE on the basis of the notified information in the information communication apparatus 200 on the RE side.

A control unit 120 in the information communication apparatus 100 on the LA side and a control unit 220 in the information communication apparatus 200 on the RE side may increase or decrease the memory area and connection band in accordance with a change in the generation rate of the transfer data, that is, a change in the number of cameras (data "generation source") serving as the acquisition terminal of the image data.

The relationship between each terminal (camera) and the memory area may be linked in a one-to-one relationship, and it is not necessary to fix the memory area to be designated. Although the details will be described later, the designated memory area may be allocated definitely or dynamically from the empty memory area. In addition, each time, the allocation area can be increased as necessary.

For this purpose, the state of each memory area is managed in three states: a state of waiting for or transferring to the RE, a state of being written, and a state of being newly writable. In the LA, when the area in the writeable state is newly reduced, this area is increased, and the memory area is also requested to be increased for the RE.

Specifically, in the example of FIG. 14, there are shown a memory area in a state of holding data under LA-RE transfer, a memory area in a state of holding data under reception in LA, and a memory area in a state of holding data under processing in the RE.

The memory allocation control and the memory state management are performed by the control unit 120. However, this is an example, and a means other than the control unit 120 (example: a smart NIC 11, an RDMA-NIC 12, an external device or the like) may be performed. Hereinafter, an operation example of the communication system illustrated in FIG. 14 will be described.

As shown in FIG. 14, 80 cameras are connected to LA. Each camera encodes each frame at a maximum of 500 kB. The frame rate is 15 FPS. Information indicating that 80 cameras are connected, each camera encodes each frame at a maximum of 500 kB, and outputs image data at 15 FPS is notified from the camera itself or the operation system to the control unit 120 on the LA side. The control unit 120 may estimate the information from the received data.

The control unit 120 secures two memory areas having a size of 500 kB×80 cameras as a memory area (that is, a memory area of a physical memory of the smart NIC 11) accessed by the RDMA-NIC 12 on the basis of the notified information, and divides the secured memory area into areas for every 500 kB. In addition, the update size is 500 kB×80 cameras.

In the figure of the memory area on the LA side of FIG. 14, the area of "000" indicates 20 areas of addresses 0 to 19, and the size of each area is 500 kB. The same applies to other regions. In other words, 80 500 kB areas are reserved in each memory area for the number of cameras.

In order to prevent the contention between read and write, two areas are allocated to each camera. For example, the area of address 0 and the area of address 80 are assigned to the camera 1, and the area of address 1 and the area of address 81 are assigned to the camera 2.

Since the frame rate of the image of each camera is 15 FPS, the total rate of 80 cameras (=data transfer rate from LA to RE) is 0.5 MB×8×15×80=60 Mbps×80=4.8 Gbps. Therefore, a control unit 120 and a control unit 220 allocate a band of 60 Mbps×80 units+β to an RDMA-NIC pair between LA and RE. β (beta) represents allocation of a band with a margin, and it is sufficient to allocate a header overhead according to a protocol for capsuling and to include other control messages, for example, about 10%.

The central memory (physical memory of the central memory card 23) in the RE information communication apparatus 200 holds data for five frames of images. Therefore, the control unit 210 secures five memory areas (update sizes) having a size of 500 kB×80 units, and divides the secured memory areas into areas for every 500 kB. In the figure of the memory area on the RE side of FIG. 14, the area of "000" indicates 20 areas of addresses 0 to 19, and the size of each area is 500 kB. The same applies to other regions.

As for the allocation of the area to each camera, for example, the areas 0, 80, 160, 240, and 320 are allocated to the camera 1, and the areas 1, 81, 161, 241, and 321 are allocated to the camera 2, thereby allocating the area to each camera.

When memory copying is performed from LA to RE, the copy destination area is rotated. Such rotation may be realized by, for example, the control unit 120 on the transmission side designating a copy destination area when a transmission request is loaded into a transmission queue, or the RDMA-NIC 12 itself may control rotation. The RE-side control unit 220 may be implemented by designating a copy destination area when a reception request designating a memory area is loaded into a reception queue by an RDMA READ operation, or the RDMA-NIC 24 itself may perform rotation control.

The TCP service in the smart NIC 11 alternately writes image data received from each camera into a region of the camera. For example, the image data of frame 1 received from camera 1 is written in the area of address 0, and the image data of frame 2 received from camera 1 is written in the area of address 80. While the image data of the frame 2 is written into the area of address 80, the image data of the area of address 0 is read out by the RDMA-NIC 12 and transferred to the RE side. Therefore, the image data of the frame 3 received from the camera 1 is written into the area of address 0. Such processing is executed for each camera.

The data transferred from the RDMA-NIC 12 to the RE side are stored in an area corresponding to the camera of the transmission source of the data in the central memory by the RDMA-NIC 24 of the RE side. In the example shown in FIG. 14, the areas "080" to "140" is shown to be data under LA-RE transfer, that is, data under writing.

In the RE side information communication apparatus 200, a plurality of programs corresponding to the purpose are run on the CPU card and the XPU card. Each program accesses the data of the central memory card by DMA or performs copy transfer. In the example shown in FIG. 14, the data "000" which has been stored before the data being transferred is stored in the physical memory of the XPU by DMA transfer, and the process is executed by the XPU.

The virtual memory address and the physical memory address in the RDMA-NIC 24 of the RE may be linked in a one-to-one relationship, and it is not necessary to fix the designated memory area. In order to store the time-series data, the physical memory address designated by the virtual memory address may be changed over time.

For example, the physical memory address corresponding to the virtual memory address=1 is changed as 81, 82, 83, 84, . . . in response to the time lapse as 1, 2, 3, 4, . . . . Thus, the time series data sequentially transmitted by designating the virtual memory address=1 can be stored in the physical memory in the order of time series, and processing efficiency can be improved. This control may be performed by an RDMA-NIC 24 or by a control unit 220.

Further, in the RE, when there are a plurality of physical devices (cardo or the like provided with an XPU and a physical memory) of transfer destinations from the RDMA-NIC 24, the virtual memory address and the physical memory device relationship may be adjusted so that the load of the physical devices becomes equal. For example, when the load is increased, the corresponding destination may be changed to another physical device. This control may be performed by an RDMA-NIC 24 or by a control unit 220.

Further, in the RE, when a certain physical device fails to function, the physical device may be made highly reliable by changing the corresponding destination to another physical device. This control may be performed by an RDMA-NIC 24 or by a control unit 220.

In the RE, N copies may be performed to improve the reliability of data. That is, a plurality of physical memory addresses may be mapped to one virtual memory address, and a value received by the RDMA-NIC 24 for the virtual memory address may be written in the plurality of physical addresses. At this time, instead of writing the same value in a plurality of physical addresses, a result of an operation such as RSE (Reed Solomon Erasure) may be written. Further, in the conversion processing for data reliability improvement, a function capable of securing security by secret sharing may be used.

In addition, N-copy by optical multicast may be performed in order to improve the reliability of data. That is, the reliability may be improved by copying the data from one LA to a plurality of REs simultaneously by optical multicast.

Effects of First Embodiment

By the technique according to the first embodiment, the CPU operation of the information communication apparatus in the local aggregation node (LA) can be reduced, and the transfer of large-capacity data between the local aggregation node (LA) and a server side (RE) on the NW located at a remote place can be realized at a high speed and with a low delay.

Further, since the CPU is not interposed in the transfer of data collected from the terminals, a large number of terminals can be accommodated with a smaller number of devices. Further, since there is no flow control such as TCP and the time required for data transfer can be shortened, for example, an AI application requiring instantaneous analysis and reaction can be realized.

Second Embodiment

Next, a second embodiment is described.

In a system for providing a service for collecting and analyzing a large number of censor information, the prior art is designed and constructed for a specific limited purpose. Therefore, when a service for a certain purpose is desired to be provided, it is necessary to construct an infrastructure such as a camera according to the purpose and to individually construct a system for analyzing sensor data such as acquired images for the service. Further, there is also a problem that, when the transfer data becomes enormous, the CPU load becomes large as the TCP/IP service of the OS layer in the communication device installed in the aggregation node that collects data of a large number of sensors and cameras and transfers the data to another node is operated by the CPU together with the data reception program.

For example, in the case of providing a new service by an application server in accordance with the trend of the society, it has to be constructed from a data collection and analysis system. That is, the conventional technique has a problem that it is difficult to provide various arbitrary services by using data collected from a plurality of terminals. Hereinafter, second embodiment for solving these problems will be described.

<Example of System Configuration>

FIG. 15 shows an example of the configuration of the data processing system according to the second embodiment. The second embodiment is based on the technique of the first embodiment, and FIG. 15 corresponds to a detailed description of the configuration from the region edge node (RE) to the application node (AP) in the system configuration shown in FIG. 8. In the second embodiment, since the AI application is assumed as an application operating in the application node, the AI application node is described as a concrete example of the application node.

As shown in FIG. 15, there are a plurality of region edge nodes (RE), message broker nodes (MB), data hub nodes (DH), and AI application nodes (AP), respectively. The region edge node (RE) and the data hub node (DH) and the data hub node (DH) and the AI application node (AP) are connected, for example, by an optical network. The message broker node (MB) and the data hub node (DH) may be collectively constituted by one node (one device).

In addition, second embodiment is a case where allocation of memory is fixed in advance according to characteristics of a use case, so that intervention of a CPU is reduced as much as possible, and a service of LA<->RE transfer and AI is executed at a low load. Here, a description will be given of an example in which communication is performed between the region edge node (RE) and the data hub node (DH) and between the data hub node (DH) and the AI application node (AP) using RDMA. Although it is not essential to use RDMA, by doing RDMA in combination, it is possible to reduce the delay of communication between the region edge node (RE) and the AI application node (AP), and it is possible to reduce the load on each node, thereby improving the node aggregation effect, and further reducing the power consumption of the entire system. The same effect can be expected when a communication system other than RDMA is used.

Any communication scheme may be used for communications between the region edge node (RE) and the message broker node (MB) and between the message broker node (MB) and the AI application node (AP). For example, RDMA may be used, or general IP communication (Internet or the like) may be used.

In the example shown in FIG. 15, the region edge node (RE) is selected from Tokyo, Osaka, Nagoya, The device is installed in Fukuoka and Yokohama.

The message broker node (MB) and the data hub node (DH) are distributed for each topic. Note that the "topic" may be called an "event". In the example of FIG. 15, MB1 and DH1 correspond to "topic=crime prevention and safety management", MB2 and DH2 correspond to "topic=number-of-people count", and MB3 and DH3 correspond to "topic=customer behavior analysis".

AI application nodes (APs) are scattered for the convenience of an application provider. In the example of FIG. 15, "suspicious person detection", "accident occurrence rate prediction", "congestion mitigation", "demand prediction and inventory optimization", and a plurality of AI application nodes (AP) for performing "microtraffic operation optimization", "shelf allocation optimization", "campaign proposal", and the like are arranged on the basis of the plurality of AI application nodes (AP).

The service provided by each AI application node (AP) is not fixed. In the second embodiment, since desired data required for providing the service can be easily acquired, any service can be easily provided.

A plurality of terminals are connected to the local aggregation node (LA) via a LAN as in the first embodiment. The terminal is, for example, a camera (smart camera).

The smart camera is an example of a device for collecting so-called sensor information, and includes an image sensor and a DSP, and has a function of encoding a camera image, compressing it, and transmitting it to the LAN. The terminal provided under the local aggregation node (LA) may be any device as long as it is a sensor device for collecting sensor information.

<Example of Device Configuration>

An example of the functional configuration of a device arranged in each node will be described below. The configuration of the information communication apparatus 100 arranged in the LA is the same as that of the information communication apparatus 100 shown in FIG. 12 (and FIG. 13) of the first embodiment.

FIG. 16 illustrates a configuration example of an edge node device 400 provided in a region edge node (RE). The function of the edge node device 400 is basically the same as the function of the RE side information communication apparatus 200 shown in FIG. 12 (FIG. 13) of the first embodiment, but in the second embodiment, event information generation and transmission and data transmission to the data hub node ara performed, and thus the configuration shown in FIG. 16 includes the function related to this point. The edge node device 400 may be called an event information generation device.

As shown in FIG. 16, the edge node device 400 includes a data transmission and reception unit 410, a control unit 440, an RDMA communication unit 430, and an event information generation unit 420. The data transmission and reception unit 410, the control unit 440, and the event information generation unit 420 are functional units realized by a CPU, an XPU, a physical memory, a user program (application), and the like. The RDMA communication unit 430 corresponds to RDMA-NIC.

A data transmission and reception unit 410 receives the data transmitted from the LA side via the RDMA communication unit 430, and stores the data in a physical memory. The data transmission and reception unit 410 transmits data to the data hub node device corresponding to the event information using the RDMA communication unit 430.

When transmitting data to the data hub node device, the data is transmitted to the data hub node device corresponding to event information (topic) corresponding to the data to be transmitted. Further, as the address of the memory area of the data storage destination in the data hub node device, the address of the memory area corresponding to the region to which the edge node device 400 of the data transmission source belongs is designated.

The event information generation unit 420 performs data analysis using an XPU or the like on data received from the LA side, generates event information based on the result of the analysis, and transmits the event information to the message broker device corresponding to the event information. The event information includes information indicating a topic, information on an analysis result, information (address or the like) identifying a storage destination (data hub node device of the storage destination and a memory area thereof) of the event information, and the like.

That is, the event information generation unit 420 includes generation means for receiving data collected from a plurality of terminals, generating event information from the data, and transmitting the generated event information to the broker device.

The data transmission and reception unit 410 and the RDMA communication unit 430 include transmission means for transmitting data corresponding to the event information to a data hub node device corresponding to the event information generated by the generation means among a plurality of data hub node devices different for each event information.

The control unit 440 grasps the size and update rate of data on the basis of information received from the LA side control unit 120 or the operation system 250, secures a memory area used by the RDMA communication unit 430 on the basis of the size and update rate of data, and securing a network band. The control unit 440 calculates a time for holding data in RE on the basis of the data processing time or the like, and secures memory areas of the number corresponding to the data holding time.

FIG. 17 shows an example of the functional configuration of the message broker device 500 provided in the message broker node (MB). The message broker device 500 may be called a broker device. It is assumed that the message broker device 500 in the second embodiment has the function of the broker in the Publisher/Subscriber model.

As shown in FIG. 17, the message broker device 500 includes a message reception unit 510, a message storage unit 520, and a message distributing unit 530. The message reception unit 510 receives a message (specifically event information) about a certain topic from the distributor (RE), and stores the received message in a message storage unit 520. A message distribution unit 530 transmits a message of a topic to a subscriber (here, an AI application node) who subscribes the topic.

FIG. 18 shows an example of the functional configuration of the data hub node device 600 provided in the data hub node (DH). As shown in FIG. 18, the data hub node device 600 includes a data transmission and reception unit. 610, a control unit 630, and an RDMA communication unit 620. The data transmission and reception unit 610 and the control unit 630 are functional units implemented by a CPU, a physical memory, a user program (application), and the like. The RDMA communication unit 620 corresponds to RDMA-NIC.

The data transmission and reception unit 610 receives data from the edge node device 400 via the RDMA communication unit 620 and stores the data in a physical memory. The data transmission and reception unit 610 also issues a transmission instruction to the RDMA communication unit 620 to transmit data to the AI application node device 700 and transmits data by RDMA. The control unit 630 secures a memory area used by the RDMA communication unit 620, secures a network band, and the like.

FIG. 19 illustrates an example of a functional configuration of an AI application node device 700 provided in an AI application node (AP). As illustrated in FIG. 19, the AI application node device 700 includes an event information processing unit 710, a data processing unit 720, an RDMA communication unit 730, and a control unit 740. The event information processing unit 710, the data processing unit 720, and the control unit 740 are functional units implemented by an XPU, a CPU, a physical memory, a user program (application), and the like. The RDMA communication unit 730 corresponds to an RDMA-NIC. The AI application node device 700 may be referred to as a data processing device.

An event information processing unit 710 acquires event information from the message broker device 500 and processes the event information. That is, the event information processing unit 710 includes acquisition means for acquiring event information corresponding to a specific service from the message broker device.

The data processing unit 720 receives data from the data hub node device 600 via the RDMA communication unit 730, stores the data in a physical memory, and executes processing by an XPU or the like. The control unit 740 secures a memory area used by the RDMA communication unit 730, secures a network band, and the like.

That is, the data processing unit 720 and the RDMA communication unit 730 include processing means for acquiring the data from a data hub node device storing the data corresponding to the event information on the basis of the event information acquired by the acquisition means, and executing processing using the data.

In addition, the AI application node device 700 may include a pool of processors constituting the data processing unit 720, and the pool or a part of the pool may be allocated to the user.

For example, an AI application node device 700 includes a plurality of XPUs, and the plurality of XPUs are defined as XPU pools. For example, the XPU pool is divided into a plurality of parts, and the divided pools are allocated to each user.

Further, a plurality of XPU pools having a plurality of XPUs may be provided. For example, when there is an XPU pool 1, an XPU pool 2, and an XPU pool 3, it is possible to perform allocation such that the XPU pool 1 is allocated to the user A, the XPU pool 2 is allocated to the user B, and the XPU pool 3 is allocated to the user C.

For the user to which the XPU pool is allocated, for example, data to be processed is transmitted from a data collection system (or the data hub node device 600 of the present embodiment) prepared by the user to the AI application node device 700. In the AI application node device 700, data of the user is transferred to an XPU pool allocated to the user, and calculation processing for the data of the user is executed. Thus, by assigning the XPU pool to the user, the logic of calculation processing can be provided as a service.

<Example of Process Sequence>

An example of the processing flow in the data processing system according to the second embodiment will be described with reference to the sequence diagram of FIG. 20. Here, an explanation will be given on the assumption that the data to be analyzed is image data (video data) transmitted from the camera.

A platform for providing data to an AI application node device 700 (data processing device) is configured by a configuration having an edge node device 400 (event information generation device) and a data hub node device 600. A platform having the edge node device 400 and the data hub node device 600 may be called a data providing system. A device for acquiring data from the data providing system and performing data processing is not limited to the AI application node device 700. For example, an application server prepared by a user may acquire data from a data providing system and perform data processing.

In S101, an event information generation unit 420 of an edge node device 400 detects an event from object detection information obtained by analyzing image data received from LA, and generates event information related to the event. In S102, an event information generation unit 420 transmits the generated event information to a message broker device 500 of a topic related to the event information.

For example, the event information generation unit 420 generates event information having "number-of-people count" as a topic when a newly recognized person image is obtained as object detection information. For example, the event information generation unit 420 generates event information having "crime prevention" as a topic when acquiring a person image detected in a specific area requiring monitoring as object detection information. For example, when a person image detected in a store or a shopping area is obtained as the object detection information, the event information generation unit 420 generates event information having "customer behavior analysis" as a topic.

The event information may include information obtained by analysis together with the topic. For example, the event information having "number-of-people count" as a topic may include the count result of the number of persons.

A data transmission and reception unit 410 transfers object image data attached to the event information to a data hub node device 600 corresponding to the event information via an RDMA communication unit 430 (S103). In this case, the event information generation unit 420 includes a virtual memory address of the data hub node device 600 of the transfer destination in event information to be transmitted in S102.

An event information processing unit 710 of the AI application node device 700 acquires event information from an event broker device 500 in S104. The event information is, for example, event information corresponding to a specific service provided by the AI application node device 700.

When the event information is event information to be processed, the event information processing unit 710 determines that the event is to be processed, and requests the data processing unit 720 to perform processing. For example, the event information processing unit 710 compares the previous event information with the current event information, and determines that the event is to be processed when there is a change in the information.

When processing an event, when image data is necessary together with the event information, a data processing unit 720 acquires image data corresponding to the event information from a data hub node device 600 by using address information included in the event information, Processing is executed (S105, S106).

Hereinafter, a more specific configuration example will be described.

<Example of Connection Configuration Between Local Aggregation Node (LA) and Region Edge Node (RE)>

The connection configuration example of the Local Aggregation Node (LA) and Region Edge Node (RE) is the same as the connection configuration example in the first embodiment and is as shown in FIG. 14. The operation is basically as described in the first embodiment.

That is, the information communication apparatus 100 in the LA has a function of a so-called proxy server, and can perform RDMA communication on a network even when a smart camera or the like does not support RDMA.

As described above, the smart NIC 11 for terminating the TCP service and writing it in the physical memory and the RDMA-NIC 12 for transferring data to the optical packet transponder 14 corresponding to the RDMA are mounted in the information communication apparatus 100 in the LA. The image data sent from the smart camera is TCP termination in the information communication apparatus 100, transferred to a virtual memory in the RDMA-NIC 12 via a physical memory in the smart NIC 11, and sent to the network side as an optical packet.

An edge node device 400 (corresponding to the information communication apparatus 200 in the first embodiment) in the RE receives data from the LA, performs various data processing, and performs event information generation or the like.

<Example of Connection Configuration from Region Edge Node (RE) to AI Application Node>

Specific examples of the edge node device 400, the message broker device 500, the data hub node device 600, and the AI application node device 700 will be described with reference to FIG. 21. Each device shown in FIG. 21 shows a configuration close to the mounting of a memory card or the like in order to show the state of data stored in the memory area.

An edge node device 400 in the RE includes an RDMA-NIC 44 for receiving data from the LA, a central memory card 43, a CPU card 42, and an XPU card 41 (GPU card or the like) for various data processing.

When the edge node device 400 receives the data from the LA, the edge node device 400 writes the data in the physical memory of the central memory card 43 via the RDMA-NIC 44. The data is stored in, for example, a physical memory of the XPU card 41 by DMA transfer. Here, assuming that the target data is image data acquired by a camera, the XPU (for example, GPU) assembles image data of a physical memory into a video and performs image analysis.

Here, analysis is performed such as the number of people who are on the image, customer behavior analysis, and whether anyone is behaving strangely for crime prevention purposes. A prior art can be used for the analysis method.

In addition, the GPU analyzes the data and generates event information corresponding to the analyzed image. The event information includes address information of a memory stored in a data hub node device 600 of a transmission destination of the corresponding image data.

The event information generation may be performed by the CPU. FIG. 21 shows an example in which the CPU performs the event information generation.

An event information generation unit 420 (corresponding to the GPO, CPU, and program described above) in the edge node device 400 of the RE transmits event information to the message broker device 500 corresponding to the event information generated by the image analysis. The transmission of the event information is not required to be RDMA, and a method such as TCP/IP may be used. The RDMA-NIC 44 transmits image data to a data hub node device 600 corresponding to the event information.

For the determination of the data hub node device 600 of the destination corresponding to the event information, for example, in the edge node device 400, a table storing an optical path address corresponding to the event information is prepared, and a data transmission and reception unit 410 refers to the table to determine a destination data hub node device 600.

The data hub node device 600 includes a central memory card 61 and an RDMA-NIC 62. An RDMA-NIC 62 of a data hub node device 600 receives image data for each specific event from a plurality of REs, and stores the data in a memory area corresponding to the RE (region). In the data hub node device 600, the RDMA-NIC 62 reads data from the physical memory and transmits the data to the AI application node device 700.

The message broker device 500 receives the event information from the edge node device 400 of the RE, and transmits the event information to the AI application node device 700 corresponding to the event information.

The AI application node device 700 is a device for providing services such as congestion prediction of a restaurant and taxi allocation management by acquiring information on congestion situations and the number of persons from various image data. As shown in FIG. 21, the configuration of the AI application node device 700 is similar to the configuration of the edge node device 400, and includes an XPU card 71, a CPU card 72, a central memory card 73, and an RDMA-NIC 74.

Although one XPU card is shown in the example of FIG. 21, this is an example. One or a plurality of XPU pools as described above may be configured by providing a plurality of XPU cards.

The AI application node device 700 previously stores which event information is to be acquired, and inquires of the address of the message broker device 500 corresponding to the corresponding event information about the presence or absence of new event information on the basis of the stored information.

For example, in a case where the AI application node device 700 stores acquisition of the number of people and event information of customer trend analysis, the AI application node device 700 inquires of the message broker device 500A related to the number of people and the message broker device 500B related to the customer trend analysis about update of image data (that is, update of event information).

The message broker device 500 transmits the held event information to the AI application node device 700 of the inquiry source when there is the updated event information in response to the inquiry from the AI application node device 700.

The AI application node device 700 compares, for example, the event information acquired this time with the event information received before, and executes event processing when there is a difference. At this time, image data corresponding to the difference is acquired from a data hub node device 600 in which the image data are stored.

Since the event information includes address information of a memory storing image data, the AI application node device 700 can access a specific area of the memory of the data hub node device 600 storing the image data on the basis of the address information.

In an AI application node device 700, an RDMA-NIC 74 writes image data received from a data hub node device 600 into a physical memory of a central memory card 73. The image data is sent to, for example, an XPU card 71 and subjected to image analysis processing. Further, for example, the CPU performs the utilization processing of the analysis result.

Effects of Second Embodiment

According to the technique according to the second embodiment, since only necessary information can be acquired according to the service that the AI application node device desires to provide, various arbitrary services can be easily provided.

When the RDMA is used for transmitting and receiving data, the CPU load is reduced, and the data transfer of transfer can be realized at a high speed and with a low delay.

(Example of Hardware Configuration)

The information communication apparatuses 100 and 200, the edge node device 400, the message broker device 500, the data hub node device 600, and the AI application node device 700 described in the first embodiment and the second embodiment can be implemented by causing a computer to execute a program, for example. The computer may be a physical computer or a virtual machine on a cloud. The information communication apparatuses 100 and 200, the edge node device 400, the message broker device 500, the data hub node device 600, and the AI application node device 700 are generally called "devices".

That is, the device can be realized by executing a program corresponding to processing performed by the device using hardware resources such as a CPU, an XPU, an RDMA-NIC, and a memory mounted on a computer. The program can be recorded in a computer-readable recording medium (portable memory or the like), saved, or distributed. The program can also be provided through a network such as the Internet or an e-mail.

FIG. 22 is a diagram illustrating an example of a hardware configuration of the computer. The computer of FIG. 22 includes a drive device 1000, an auxiliary storage device 1002, a memory device 1003, a CPU (or XPU) 1004, an interface device 1005 (for example, RDMA-NIC), a display device 1006, an input device 1007, an output device 1008, and the like, which are mutually connected via a bus B. Of these, some of the devices may not be provided. For example, in a case where display is not performed, the display device 1006 may not be provided.

The program that realizes processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program need not necessarily be installed from the recording medium 1001 and may be downloaded from another computer via a network. The auxiliary storage device 1002 stores the installed program and also stores necessary files, data, and the like.

The memory device 1003 reads and stores the program from the auxiliary storage device 1002 when there is an instruction to start the program. The CPU (XPU) 1004 implements functions related to the device according to the program stored in the memory device 1003. The interface device 1005 is used as an interface for connection to a network. The display device 1006 displays a graphical user interface (CUI) or the like according to a program. The input device 1007 is constituted by a keyboard and a mouse, buttons, a touch panel, or the like and is used for inputting various operation instructions. The output device 1008 outputs a calculation result.

Conclusion of Embodiments

In the present specification, at least the device, the method, the program, and the like described in each item below are described in correspondence with the first embodiment and the second embodiment.

Items Corresponding to First Embodiment

Item 1

An information communication apparatus, which aggregates data transmitted from a plurality of terminals and transmits the aggregated data to a reception side, the information communication apparatus including:
  a determination means that operates in a first layer for determining an update size of a memory area used to hold the data transmitted from the plurality of terminals on a basis of information related to the data; and
  a setting means that sets a band of a network path of a second layer necessary for communicating with the reception side on a basis of the update size and an update rate of the data.

Item 2

The information communication apparatus according to item 1, wherein the determination means determines the update size on a basis of a number of the plurality of terminals and an amount of data transmitted at the update rate from each of the plurality of terminals.

Item 3

The information communication apparatus according to item 1 or 2, wherein the determination means secures, as the memory area, a memory area at least 2 times the update size.

Item 4

The information communication apparatus according to any one of items 1 to 3, further including: an RDMA communication means for performing communication in the network path by RDMA.

Item 5

The information communication apparatus according to item 4, wherein the RDMA communication means performs data transmission on a basis of an RDMA READ operation executed from a node device on the reception side.

Item 6

The information communication apparatus according to item 4 or 5, wherein a plurality of memory areas of the update size is secured in the node device on the reception side according to a holding time of data received from the information communication apparatus, and the RDMA communication means rotates a memory area of a storage destination of data in the node device on the reception side.

Item 7

An information communication method, which is executed in an information communication apparatus that aggregates data transmitted from a plurality of terminals and transmits the aggregated data to a reception side, the information communication method including:
  a step by a determination means that operates in a first layer for determining an update size of a memory area used to hold the data transmitted from the plurality of terminals on a basis of information related to the data; and
  a step of setting a band of a network path of a second layer necessary for communicating with the reception side on a basis of the update size and an update rate of the data.

Item 8

A program for causing a computer to function as respective means in the information communication apparatus according to any one of items 1 to 6.

Items Corresponding to Second Embodiment

Item 1

A data processing system including:
  an event information generation device including: a generation means that receives data collected from a plurality of terminals, generates event information from the data, and transmits the generated event information to a broker device; and a transmission means that transmits the data corresponding to the event information to a data hub node device corresponding to the event information generated by the generation means among a plurality of data hub node devices different for each event information; and
  a data processing device including: an acquisition means that acquires event information corresponding to a specific service from the broker device; and a processing means that acquires data from a data hub node device that stores the data corresponding to the event information on the basis of the event information acquired by the acquisition means, and executes processing using the data.

Item 2

The data processing system according to item 1, wherein the event information includes address information of a memory that stores data corresponding to the event information.

Item 3

The data processing system according to item 1 or 2, wherein the generation means generates the event information by performing image analysis on the collected data.

Item 4

The data processing system according to any one of items 1 to 3, wherein the event information generation device transmits data to the data hub node device using RDMA, and the data processing device acquires data from the data hub node device using RDMA.

Item 5

A data providing system including:
  an event information generation device including: a generation means that receives data collected from a plurality of terminals, generates event information from the data, and transmits the generated event information to a broker device; and a transmission means that transmits the data corresponding to the event information to a data hub node device corresponding to the event information generated by the generation means among a plurality of data hub node devices different for each event information; and
  a data hub node device including: a reception means that receives the data corresponding to the event information generated by the generation means; and a transmission means that transmits the data to a data processing device that has acquired the event information.

Item 6

An event information generation device including:
  an event information generation device including: a generation means that receives data collected from a plurality of terminals, generates event information from the data, and transmits the generated event information to a broker device; and
  a transmission means that transmits the data corresponding to the event information to a data hub node device corresponding to the event information generated by the generation means among a plurality of data hub node devices different for each event information.

Item 7

A data processing device including: an acquisition means that acquires event information corresponding to a specific service from the broker device; and
  a processing means that acquires data from a data hub node device that stores the data corresponding to the event information on the basis of the event information acquired by the acquisition means, and executes processing using the data.

Item 8

The data processing device according to item 7, wherein the data processing device includes a pool of processors constituting the processing means, and the pool or a part of the pool is allocated to a user.

Item 9

A data processing method, which is executed in a data processing system including an event information generation device and a data processing device, the data processing method including:
  a generation step of receiving, by the event information generation device, data collected from a plurality of terminals, generating event information from the data, and transmitting the generated event information to a broker device;

a transmission step of transmitting, by the event information generation device, data corresponding to event information to a data hub node device corresponding to the event information generated in the generation step among a plurality of data hub node devices different for each event information;

an acquisition step of acquiring event information corresponding to a specific service from the broker device by the data processing device; and a processing step of acquiring data from a data hub node device storing the data corresponding to event information on the basis of the event information acquired by the acquisition step and executing processing using the data by the data processing device.

Item 10

A program for causing a computer to function as respective means in the event information generation device according to item 6.

Item 11

A program for causing a computer to function as respective means in the data processing device according to item 7 or 8.

Although the embodiment has been described above, the present invention is not limited to the specific embodiment, and various modifications and changes can be made within the scope of the gist of the present invention described in the claims.

REFERENCE SIGNS LIST

LA Local aggregation node
RE Region edge node
AP Application node
MB Message broker node
DB Data hub node
100 Information communication apparatus
110 Data transmission unit
120 Control unit
130 RDMA communication unit
200 Information communication apparatus
210 Data reception unit
220 Control unit
230 RDMA communication unit
250 Operation system
300 Optical network
400 Edge node device
410 Data transmission and reception unit
420 Event information generation unit
430 RDMA communication unit
440 Control unit
500 Message broker device
510 Message reception unit
520 Message storage unit
530 Message distribution unit
600 Data hub node device
610 Data transmission and reception unit
620 RDMA communication unit
630 Control unit
700 AI application node device
710 Event information processing unit
720 Data processing unit
730 RDMA communication unit
740 Control unit 1000 Drive device
1001 Recording medium
1002 Auxiliary storage device
1003 Memory device
1004 CPU
1005 Interface device
1006 Display device
1007 Input device
1008 Output device

The invention claimed is:

1. An information communication apparatus, which aggregates time-series data transmitted from a plurality of sensor terminals and transmits the aggregated time-series data to a reception side, the information communication apparatus comprising:
  a processor, and
  a memory storing program instructions that cause the processor to:
    determine an update size of a memory area used to hold the time-series data transmitted from the plurality of sensor terminals on a basis of information related to the time-series data; and
    set a band of a network path by Remote Direct Memory Access (RDMA) communication necessary for communicating with the reception side on a basis of the update size and a frame rate of the time-series data.

2. The information communication apparatus according to claim 1, wherein the program instructions cause the processor to determine the update size on a basis of a number of the plurality of sensor terminals and an amount of time-series data transmitted at the frame rate from each of the plurality of sensor terminals.

3. The information communication apparatus according to claim 1, wherein the program instructions cause the processor to secure, as the memory area, a memory area at least 2 times the update size.

4. The information communication apparatus according to claim 1, wherein
  a plurality of memory areas of the update size is secured in a node device on the reception side according to a holding time of time-series data received from the information communication apparatus, and
  the program instructions cause the processor to rotate a memory area of a storage destination of time-series data in the node device on the reception side.

5. The information communication apparatus according to claim 1, wherein the program instructions cause the processor to perform data transmission on a basis of an RDMA READ operation executed from a node device on the reception side.

6. A non-transitory computer-readable storage medium that stores therein a program for causing a computer to function as the information communication apparatus according to claim 1.

7. An information communication method, which is executed in an information communication apparatus that aggregates time-series data transmitted from a plurality of sensor terminals and transmits the aggregated time-series data to a reception side, the information communication method comprising:
  determining an update size of a memory area used to hold the time-series data transmitted from the plurality of sensor terminals on a basis of information related to the time-series data; and
  setting a band of a network path by Remote Direct Memory Access (RDMA) communication necessary for communicating with the reception side on a basis of the update size and a frame rate of the time-series data.

* * * * *